(12) United States Patent
Kafle et al.

(10) Patent No.: US 9,578,514 B2
(45) Date of Patent: Feb. 21, 2017

(54) METHOD, APPARATUS, AND COMPUTER PROGRAM PRODUCT FOR ENABLEMENT

(75) Inventors: Padam Lal Kafle, Coppell, TX (US); Mika Ilkka Tapani Kasslin, Espoo (FI); Prabodh Varshney, Coppell, TX (US)

(73) Assignee: Nokia Technologies Oy, Espoo (FI)

( * ) Notice: Subject to any disclaimer, the term of this patent is extended or adjusted under 35 U.S.C. 154(b) by 441 days.

(21) Appl. No.: 13/468,989

(22) Filed: May 10, 2012

(65) Prior Publication Data

US 2013/0300941 A1    Nov. 14, 2013

(51) Int. Cl.
*H04W 16/14* (2009.01)
*H04L 27/00* (2006.01)

(52) U.S. Cl.
CPC .......... *H04W 16/14* (2013.01); *H04L 27/0006* (2013.01)

(58) Field of Classification Search
CPC combination set(s) only.
See application file for complete search history.

(56) References Cited

U.S. PATENT DOCUMENTS

| | | | |
|---|---|---|---|
| 2007/0060127 A1* | 3/2007 | Forsberg | H04L 63/061 455/436 |
| 2008/0039090 A1* | 2/2008 | Jin | H04W 36/26 455/436 |
| 2010/0220687 A1* | 9/2010 | Reznik et al. | 370/331 |
| 2011/0080882 A1 | 4/2011 | Shu et al. | |
| 2011/0134887 A1* | 6/2011 | Jeon et al. | 370/331 |
| 2011/0143761 A1 | 6/2011 | Uusitalo | |
| 2011/0305206 A1 | 12/2011 | Junell et al. | |

(Continued)

FOREIGN PATENT DOCUMENTS

| WO | 2011015960 A1 | 2/2011 |
|---|---|---|
| WO | 2011023206 A1 | 3/2011 |

(Continued)

OTHER PUBLICATIONS

Reconfigurable radio systems (RRS); feasibility study on radio frequency (RF) performances for cognitive radio systems operating in UHF TV band white spaces. ETSI Technical Report. ETSI Draft; RRSWG1 (11) _Draft_TR_103_067_V0007; downloaded by EPO on Nov. 17, 2011; pp. 1-53; [retrieved on Sep. 17, 2012]. EPOQUENET NPL XP014068824.

(Continued)

*Primary Examiner* — Junpeng Chen
(74) *Attorney, Agent, or Firm* — Locke Lord LLP

(57) ABSTRACT

Method, apparatus, and computer program product embodiments of the invention are disclosed for enablement employable, for example, in operation in TV white spaces. In an example embodiment of the invention, a method, comprises: receiving, at a master white space device, slave white space device enablement information, wherein said slave white space enablement information corresponds to a further master white space device enablement grant; performing decision, at the master white space device, with respect to one or more of: employment, in connection with the master white space device, of the further master white space device enablement grant; need for additional information; and need for database query; and determining to dispatch, from the master white space device, an indication regarding the decision.

21 Claims, 11 Drawing Sheets

(56) References Cited

U.S. PATENT DOCUMENTS

2011/0305341 A1* 12/2011 Hahn .................... H04L 63/205
  380/272
2012/0008604 A1  1/2012 Kasslin
2012/0082315 A1*  4/2012 Bai ....................... H04L 9/0825
  380/272
2012/0233635 A1*  9/2012 Hakola et al. .................. 725/25

FOREIGN PATENT DOCUMENTS

WO  WO 2011/074825  *  6/2011
WO  2012005460 A2  1/2012

OTHER PUBLICATIONS

Ecclesine P. et al. 'OFCOM ECC TR 159 TVWS terminology', IEEE Mentor, IEEE Standards Association, IEEE 802.11 WLAN WG, [online], Nov. 1, 2011, 12 pages, [retrieved on Sep. 18, 2012], Retrieved from the Internet: <URL: https://mentor.ieee.org/802.11/documents>.

PCT International Search Report dated Jun. 28, 2013 in corresponding International Application No. PCT/FI2013/050436.

* cited by examiner

METHOD, APPARATUS, AND COMPUTER PROGRAM PRODUCT FOR ENABLEMENT

FIELD

The field of the invention relates to enablement employed, for example, for operation in TV white spaces.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, mobile networks such as CDMA2000, WCDMA, HSPA, LTE, and IMT, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. Unassigned or un-used frequencies also appear locally inside the frequency bands, which are otherwise allocated in other locations. The unassigned frequency bands and guard bands are referred to as white spaces.

TV white space may be broadly defined as broadcast television spectrum that is unused by licensed services. There are at least two categories of TV white space: Dedicated TV white space is a portion of the spectrum that the FCC has reallocated to unlicensed use from previously analog broadcast usage, and locally unused spectrum by licensed TV broadcasters in a geographic area.

Dedicated TV white space: In the United States, with a federally mandated transformation of analog TV broadcasting to digital TV broadcasting, portions of the broadcast spectrum previously employed for analog TV became unused and were dedicated by the FCC for unlicensed use. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Locally unused spectrum by licensed TV broadcasters: The FCC has adopted rules to allow unlicensed radio transmitters to operate in the broadcast television spectrum at locations where that spectrum is not being used by licensed broadcasters. The FCC proposes two mechanisms to enable the unlicensed transmitters to discover the available channels: a geo-location and database based approach which is mandatory for all such devices, and an optional approach based on spectrum sensing capability. The operation under the control of a geo-location based database is called for in connection with the unlicensed transmitter. The FCC proposed the use of geo-location to establish the location of the unlicensed transmitter and a database of TV bands use by licensed broadcasters organized by their geographic coverage areas, to enable the unlicensed transmitter to know where local TV band white spaces may be available. The FCC proposed the use of spectrum sensors in the unlicensed transmitter to optionally detect the presence of the incumbent, primary TV broadcaster's signal in the local TV band to enable the unlicensed transmitter to immediately relinquish using the band. A primary user in such a local TV band would be an incumbent TV broadcaster licensed to operate in that band, but in those geographic areas where there are no licensed incumbent TV broadcasters in operation, other unlicensed secondary users may make use of that band. There may be also other incumbent users in the TV band, which the secondary users should avoid, such as program making and special events (PMSE) systems.

In addition to the United States, other countries are also considering to enable unlicensed, secondary operation in TV band white spaces. The requirements may slightly differ in different countries, e.g. in the United States the maximum transmit power for unlicensed device is defined based on the device type, whereas in Europe location specific maximum transmission power has been considered. In that case the maximum allowed transmission power for an unlicensed device would depend on the device geo-location, i.e. the distance from the primary users. The device characteristics, such as emission mask/ACLR (adjacent channel leakage ratio) may affect the maximum allowed transmission power.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band. Further, other schemes of secondary use of spectrum, other than unlicensed schemes may exist, such as licensing, regulator defined policies, cognitive principles, or authorized shared access.

SUMMARY

Method, apparatus, and computer program product embodiments of the invention are disclosed for enablement employable, for example, in operation in TV white spaces.

In an example embodiment of the invention, a method, comprises:

receiving, at a master white space device, slave white space device enablement information, wherein said slave white space enablement information corresponds to a further master white space device enablement grant;

performing decision, at the master white space device, with respect to one or more of:
  employment, in connection with the master white space device, of the further master white space device enablement grant;
  need for additional information; and
  need for database query; and
determining to dispatch, from the master white space device, an indication regarding the decision.

In an example embodiment of the invention, the method further comprises:
  generating, at the master white space device, further slave white space device enablement information; and
  determining to dispatch, from the master white space device, the generated further white space device enablement information.

In an example embodiment of the invention, the method further comprises wherein the received white space device enablement information and the further white space device enablement information each comprise an enablement identifier and/or a slave white space device enablement validity time.

In an example embodiment of the invention, the method further comprises wherein the received white space device enablement information and the further white space device enablement information each further comprise at least one of:
  a slave white space device identifier;
  regulatory operating parameter information; and
  at least one slave white space signature and/or key, wherein said at least one slave white space signature and/or key validates the slave white space identifier.

In an example embodiment of the invention, the method further comprises wherein the receipt is via a direct slave white space device link.

In an example embodiment of the invention, the method further comprises wherein the receipt is via a master white space device-to-master white space device link.

In an example embodiment of the invention, the method further comprises wherein the receipt is via an authentication request frame and wherein the dispatch of the indication regarding the decision is via an authentication response frame.

In an example embodiment of the invention, the method further comprises:
  distributing the generated further white space device enablement information to at least one other master white space device via at least one master white space device-to-master white space device link.

In an example embodiment of the invention, a method comprises:
  receiving, at a slave white space device, enablement information, wherein said enablement information corresponds to a first master white space device enablement grant;
  receiving, at the slave white space device, a second master white space device indication of one or more of:
    a directive regarding a second master white space device applicability of the first master white space device enablement grant;
    a need for additional information; and
    a database query requirement; and
  performing, at the slave white space device, decision regarding a second master white space device application of the first master white space device enablement grant.

In an example embodiment of the invention, the method further comprises:
  determining to perform a direct second master white space device provision of said enablement information.

In an example embodiment of the invention, the method further comprises:
  determining to perform, via a master white space device-to-master white space device link, an indirect second master white space device provision of said enablement information.

In an example embodiment of the invention, the method further comprises wherein the receipt of said enablement information is via an enablement response frame and wherein the receipt of the indication is via an authentication response frame.

In an example embodiment of the invention, the method further comprises wherein the enablement information comprises an enablement identifier and/or a slave white space device enablement validity time.

In an example embodiment of the invention, the method further comprises wherein the enablement information further comprises at least one of:
  a slave white space device identifier;
  regulatory operating parameter information; and
  at least one slave white space signature and/or key, wherein said at least one slave white space signature and/or key validates the slave white space identifier.

In an example embodiment of the invention, the method further comprises:
  determining to dispatch one or more parameters responsive to said indication of need for additional information.

In an example embodiment of the invention, an apparatus comprises:
  at least one processor; and
  at least one memory including computer program code, the at least one memory and the computer program code configured to, with the at least one processor, cause the apparatus at least to perform:
    receive, at the apparatus, slave white space device enablement information, wherein said slave white space enablement information corresponds to a master white space device enablement grant;
    perform decision, at the apparatus, with respect to one or more of:
      employment, in connection with the apparatus, of the master white space device enablement grant;
      need for additional information; and
      need for database query; and
    determine to dispatch, from the apparatus, an indication regarding the decision.

In an example embodiment of the invention, the apparatus further comprises wherein the at least one memory and the computer program code are further configured to, with the at least one processor, cause the apparatus to:
  generate, at the apparatus, further slave white space device enablement information; and
  determine to dispatch, from the apparatus, the generated further white space device enablement information.

In an example embodiment of the invention, the apparatus further comprises wherein the received white space device enablement information and the further white space device enablement information each comprise an enablement identifier and/or a slave white space device enablement validity time.

In an example embodiment of the invention, the apparatus further comprises wherein the receipt is via a direct slave white space device link.

In an example embodiment of the invention, the apparatus further comprises wherein the receipt is via a master white space device-to-master white space device link.

In an example embodiment of the invention, the apparatus further comprises wherein the at least one memory and the computer program code are further configured to, with the at least one processor, cause the apparatus to:

distribute the generated further white space device enablement information to at least one master white space device via at least one master white space device-to-master white space device link.

In an example embodiment of the invention, an apparatus comprises:

at least one processor; and at least one memory including computer program code, the at least one memory and the computer program code configured to, with the at least one processor, cause the apparatus at least to perform:

receive, at the apparatus, enablement information, wherein said enablement information corresponds to a first master white space device enablement grant;

receive, at the apparatus, a second master white space device indication of one or more of:

a directive regarding a second master white space device applicability of the first master white space device enablement grant;

a need for additional information; and a database query requirement; and perform, at the apparatus, decision regarding a second master white space device application of the first master white space device enablement grant.

In an example embodiment of the invention, the apparatus further comprises wherein the at least one memory and the computer program code are further configured to, with the at least one processor, cause the apparatus to:

determine to perform a direct second master white space device provision of said enablement information.

In an example embodiment of the invention, the apparatus further comprises wherein the at least one memory and the computer program code are further configured to, with the at least one processor, cause the apparatus to:

determine to perform, via a master white space device-to-master white space device link, an indirect second master white space device provision of said enablement information.

In an example embodiment of the invention, the apparatus further comprises wherein the enablement information comprises an enablement identifier and/or a slave white space device enablement validity time.

In an example embodiment of the invention, the apparatus further comprises wherein the at least one memory and the computer program code are further configured to, with the at least one processor, cause the apparatus to:

determine to dispatch one or more parameters responsive to said indication of need for additional information.

In an example embodiment of the invention, a computer program product comprising computer executable program code recorded on a computer readable storage medium, the computer executable program code comprising:

code for causing receipt, at a master white space device, of slave white space device enablement information, wherein said slave white space enablement information corresponds to a further master white space device enablement grant;

code for causing performance of decision, at the master white space device, with respect to one or more of:

employment, in connection with the master white space device, of the further master white space device enablement grant;

need for additional information; and need for database query; and code for causing determination to dispatch, from the master white space device, an indication regarding the decision.

In an example embodiment of the invention, a computer program product comprising computer executable program code recorded on a computer readable storage medium, the computer executable program code comprising:

code for causing receipt, at a slave white space device, of enablement information, wherein said enablement information corresponds to a first master white space device enablement grant;

code for causing receipt, at the slave white space device, of a second master white space device indication of one or more of:

a directive regarding a second master white space device applicability of the first master white space device enablement grant;

a need for additional information; and a database query requirement; and code for causing performance, at the slave white space device, of decision regarding a second master white space device application of the first master white space device enablement grant.

In this manner, embodiments of the invention provide enablement employable, for example, in operation in TV white spaces.

DISCUSSION OF EXAMPLE EMBODIMENTS OF THE INVENTION

Example Networking Environment

Figure 1:
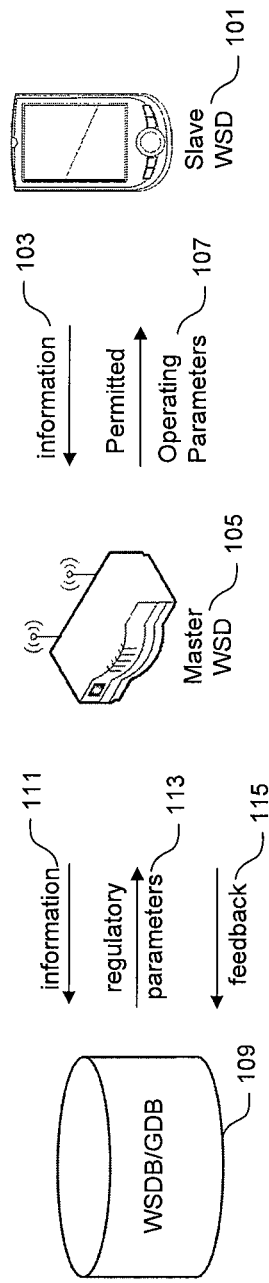
FIG. 1 discloses an exemplary network in accordance with at least one example embodiment of the present invention.

The unlicensed use of white spaces in television (TV) broadcast bands—termed as TV white spaces (TVWS)—is permitted at least in connection with various regulations. As one example, in the United States the Federal Communications Commission (FCC) has released rules for unlicensed operation in such white spaces. As another example, in the United Kingdom the United Kingdom Office of Communications (Ofcom) has released draft requirements for such unlicensed operation.

Such regulations, generally characterized, permit unlicensed wireless devices to operate in regions of the very high frequency (VHF) and/or ultra high frequency (UHF) spectrum bands (e.g., 54 MHz-698 MHz in US) in an opportunistic sharing basis when any of the designated TV channel frequencies are not occupied by the primary users of these spectrum bands. The primary users include licensed TV broadcasters and wireless microphone systems. The amount of TVWS spectrum available for unlicensed use varies substantially based at least on the presence of primary users such as TV broadcasting services and licensed microphone users around the relevant geo-graphic location. In order to achieve goals including enforcing regulatory requirements and protecting services of primary users in the bands, relevant regulations generally call for the use of white space databases/geo-location databases (WSDBs/GDBs). A WSDB/GDB performs operations including providing available channels and other parameters for operation of unlicensed devices and/or networks.

A number of applications take advantage of white spaces. One exemplary application of white spaces is in connection with wireless local area networks (WLANs). The use of white spaces in connection with WLANs yields a number of potential benefits including additional available spectrum and, at least as the VHF band and the lower UHF band provide longer range than is typically possible for WLAN systems in 2.4 or 5 GHz bands, better propagation characteristics.

Institute of Electrical and Electronics Engineers draft standard IEEE 802.11af is one exemplary draft standard for the use of white spaces in connection with WLANs. In addition, exemplary technical requirements and operational frameworks for the use of white spaces in connection with WLANs include those of industry forums such as the Wi-Fi Alliance (WFA).

The devices that operate in TV white spaces are referred as white space devices (WSD). Exemplary draft standard IEEE 802.11af assumes two types of WSD stations (STAs)—enabling STAs and dependent STAs. The functionality of these STAs under the draft standard generally maps to the FCC model. There is a potential for addition to the standard of aspects based on requirements from other regulations (e.g., Ofcom).

According to the draft standard, an enabling STA is to have self geo-location capability and should be able to talk to a WSDB/GDB to initiate a WLAN network. A dependent STA is assumed to be not capable of communicating with a WSDB/GDB. Such dependent STA is allowed to operate subsequent to enablement by an enabling STA. The establishment of initial enablement and subsequent control during operation of dependent STAs is provided by using a geo-location database control (GDC) enablement process, a channel availability query process (CAQ), and a contact verification signal process.

According to the draft standard, during the GDC enablement process a dependent STA, such as a dependent STA of the FCC Mode I personal/portable device type, is able to send its device identification information (e.g., FCC ID) for verification and receive list of channels available for its use. The channel availability query procedure from the dependent STA allows for the acquisition of available channel list during operation, with the acquisition providing for maintenance of the validity of an enablement timer. The CAQ is also be initiatable from an enabling STA to obtain list of permissible channels and/or associated parameters from a registered location secure server (RLSS). A dependent STA further hears a unicast contact verification signal (CVS) frame at least every 60 s to ensure it is within the coverage area of the enabling STA.

FIG. 1 shows an exemplary network employable in various exemplary embodiments of the present invention discussed herein. According to the example of FIG. 1, slave WSD 101 passes information 103, such as device identification (e.g., FCC ID in US, or other unique device identifier), technology identifier (e.g., to indicate emission mask category of the device, signal waveform, etc.), type of device, location and/or location accuracy, and/or antenna characteristics, to master WSD 105 and obtains therefrom permitted operating parameters 107.

Further according to the example of FIG. 1, master WSD 105 passes to WSDB/GDB 109 information 111 and receives in reply regulatory parameters 113. Information 111 includes one or more of information 103 received from slave WSD 101, like information for master WSD 105, and like information received from other slave WSDs managed by master WSD 105. Regulatory parameters 113 include one or more of regulatory parameters for slave WSD 101, regulatory parameters for master WSD 105, and regulatory parameters for other slave WSDs managed by master WSD 105. The regulatory parameters include data such as one or more of available channel list, regulatory maximum transmit power level, time validity information, frequency range, permitted equivalent isotropically radiated power (EIRP) spectral densities, and control commands to cease transmissions.

Additionally according to the example of FIG. 1, master WSD 105 provides permitted operating parameters 107 to slave WSD 101. Moreover, master WSD 105 provides like information to other slave WSDs which it manages. Also, master WSD 105 employs in its own operation its own regulatory parameters.

Further according to the example of FIG. 1, WSDB/GDB 109 collects usage feedback 115 corresponding to parameters such as actual usage of assigned frequency range and EIRP power spectral densities in that frequency range. Usage feedback 115 includes usage feedback for one or more of master WSD 105, slave WSD 101, and other slave WSDs managed by master WSD 105. WSDB/GDB 109 receives usage feedback 115 from master WSD 105, with master WSD 105 having received usage feedback for slave WSD 101 and other associated slave WSDs from those WSDs. WSDB/GDB 109 employs feedback 115 for purposes including dynamically changing WSD allocated power levels.

WSD bands (e.g., UHF bands) tend to enjoy propagation characteristics superior to alternative transmission modes, and in some cases provides for WSD operation at powers higher than that which is provided for by alternative transmission modes. As such, TVWS band WLAN (e.g., Wi-Fi WLAN) networks are likely to have larger coverage areas compared to networks in legacy WLAN bands. Such ability to deploy larger coverage area WLAN networks has the potential to increase the deployment of outdoor WLAN networks for WSDs, such as those in city centers and parking lots, and of large indoor WLAN networks for WSDs, such as those in large malls and entertainment centers, without having to resort to large numbers of access points. As such larger coverage area WSD WLAN networks become more prevalent, issues relating to WSD movement with respect to those networks will likely arise with greater frequency. However, WSD mobility tends to complicate WLAN network management.

Techniques discussed herein are applicable, for example, in facilitating slave WSD mobility in the context of WLAN networks which operate within the TVWS spectrum. Facilitated, for example, is supporting a slave WSD moving away from a first basic service set (BSS) (e.g., serving a first location) to coverage of a second BSS (e.g., serving a second location remote from the first location) in a fashion yielding a number of potential benefits including one or more of allowing the master-slave relationship of the slave WSD with respect to the first BSS to be replaced by an analogous relationship in the second BSS within a short time, reducing the occurrence of database query delays (e.g., WSDB/GDB query delays), reducing the occurrence of device ID validation delays, allowing for quicker fast BSS transition (e.g., IEEE 802.11r fast BSS transition), and maintaining service and/or session continuity.

It is noted that an alternative term for a slave WSD is "dependent" WSD, and that an alternative term for a master WSD is "enabling" WSD. Further, an alternative term for a WSD is "station" (STA). Additionally, a WSD discussed herein optionally performs acting as an access point (AP) and/or managing one or more other WSDs. Also, the herein discussed management by a first WSD of one or more other WSDs optionally includes the first WSD performing operations whereby those other WSDs are within a BSS (e.g., an 802.11 BSS) of that first WSD. Moreover, an alternative term for a slave WSD initiating a fast BSS transition (e.g., in accordance with IEEE 802.11r) is fast BSS transition originator (FTO).

General Enablement Functionality

Exemplary general enablement functionality will now be discussed.

Figure 2:
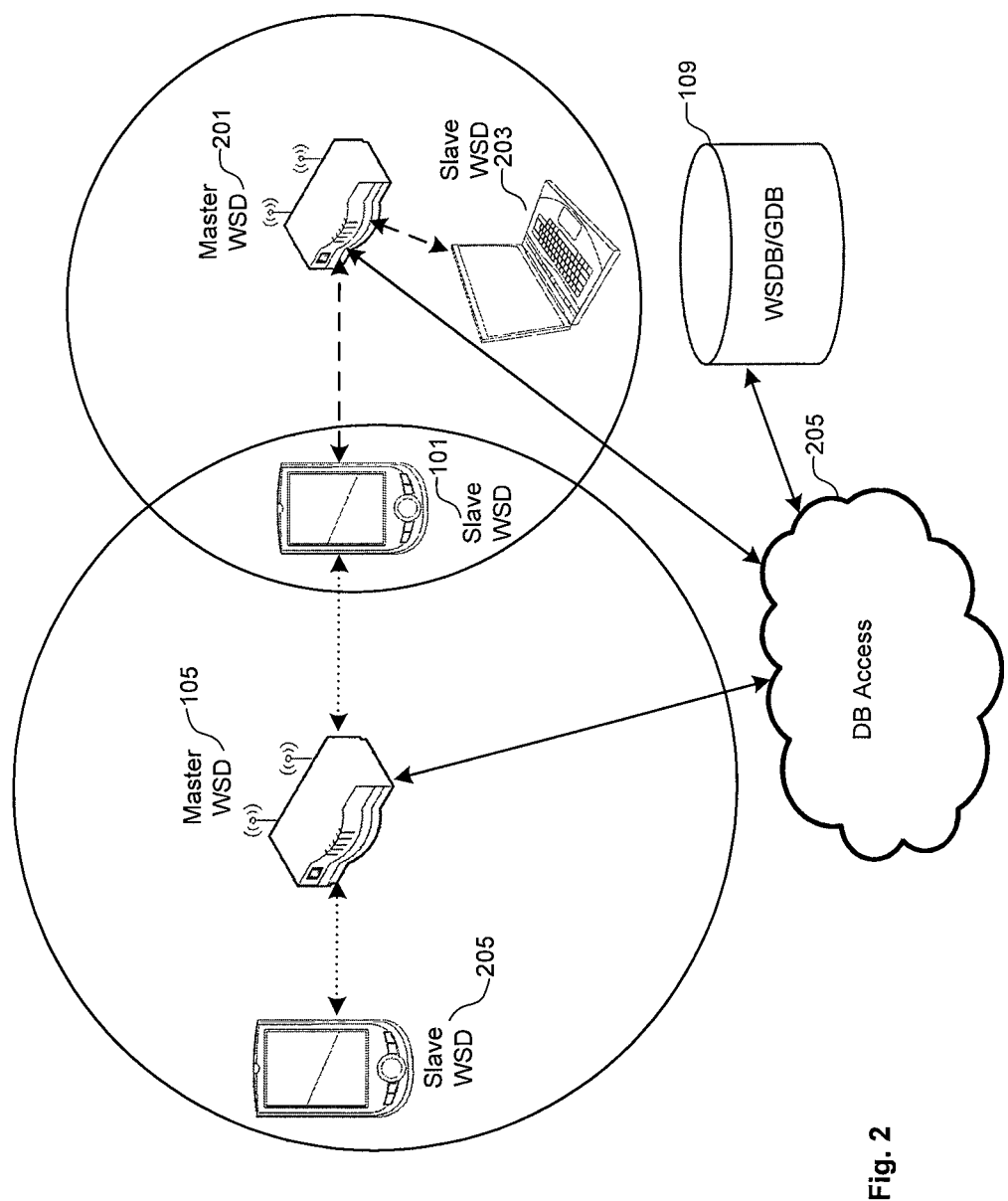
FIG. 2 discloses an exemplary deployment scenario for enablement functionality in accordance with at least one example embodiment of the present invention.

As an illustrative example of such functionality, shown in FIG. 2 is an exemplary deployment scenario for the enablement functionality now discussed. Master WSD 105 operates as an AP (e.g., an IEEE 802.11 AP) which manages WSD operation (e.g., provides channel availability lists, permitted transmit power levels, and/or other permitted operating parameters, and/or one or more permitted operating parameter time validities) for slave WSD 205 and slave WSD 101. Likewise, master WSD 201 operates as an AP (e.g., an IEEE 802.11 AP) which manages WSD operation for slave WSD 203. Each of slave WSD 101, slave WSD 205, and slave WSD 203 is implementable capable of full self geo-location, capable of partial self geo-location, or incapable of self geo-location. Master WSD 105 operates a first basic service set (BSS) (e.g., an 802.11 BSS) while master WSD 201 operates a second BSS (e.g., an 802.11 BSS). Each of the two BSSs operates in the TVWS band within same mobility domain (MD) of the same extended service set (ESS). Slave WSD 101 is presently managed by master WSD 105 and within master WSD 105's BSS, but has moved so as to be capable of joining the group of WSDs managed by master WSD 201 and of being within master WSD 201's BSS. As a non-limiting example, master WSD 105's BSS is an outdoor BSS, master WSD 105 is an outdoor fixed master device, master WSD 201's BSS is an indoor BSS, master WSD 201 is a fixed indoor master or a portable/portable master device, and slave WSD 101 has moved from outside to indoors.

Further according to the illustrative example, before starting fast BSS transition (FT) process to transition from master WSD 105's BSS to master WSD 201's BSS slave WSD 101 acts to determine one or more of if it is around the edge of a network and if current services cannot be continued due to link condition degradation. Such determination functionality is implementable via conditions set based on various algorithms implemented in slave WSD 101 and/or with network support. As a non-limiting example, such network support is employed with a goal of reducing the delay for such determination functionality.

Still further according to the illustrative example, IEEE 802.11r fast BSS transition procedures are employed, yielding a number of potential benefits including allowing faster authentication and/or key management prior to reassociation. As such, employed by the WSDs of FIG. 2 are FT initial mobility domain association (e.g., in accordance with 802.11r), over-the-air fast BSS transition (e.g., in accordance with 802.11r), and/or over the distribution system (over-the-DS) fast BSS transition (e.g., in accordance with 802.11r.

Additionally according to the illustrative example, as the WSDs of FIG. 2 operate in TVWS, a slave WSD of FIG. 2 is enabled by a master WSD of FIG. 2. Such enablement involves database query and/or database device ID validation involving database access communication 205 between a master WSD of FIG. 2 and WSDB/GDB 109. Interplay between TVWS employment and fast BSS transition often increases complexity. Such complexity is potentially mitigated by the functionality discussed herein which, in one exemplary aspect, involves the signaling of information involving one or more of employed databases and enablement related parameters between a slave WSD and a target master WSD prior to FT reassociation, with the enablement of the slave WSD being granted without the delay typically associated with the database consultation and/or the enablement process itself.

Principal Enablement Functionality

Exemplary principal enablement functionality will now be discussed.

Figure 3:
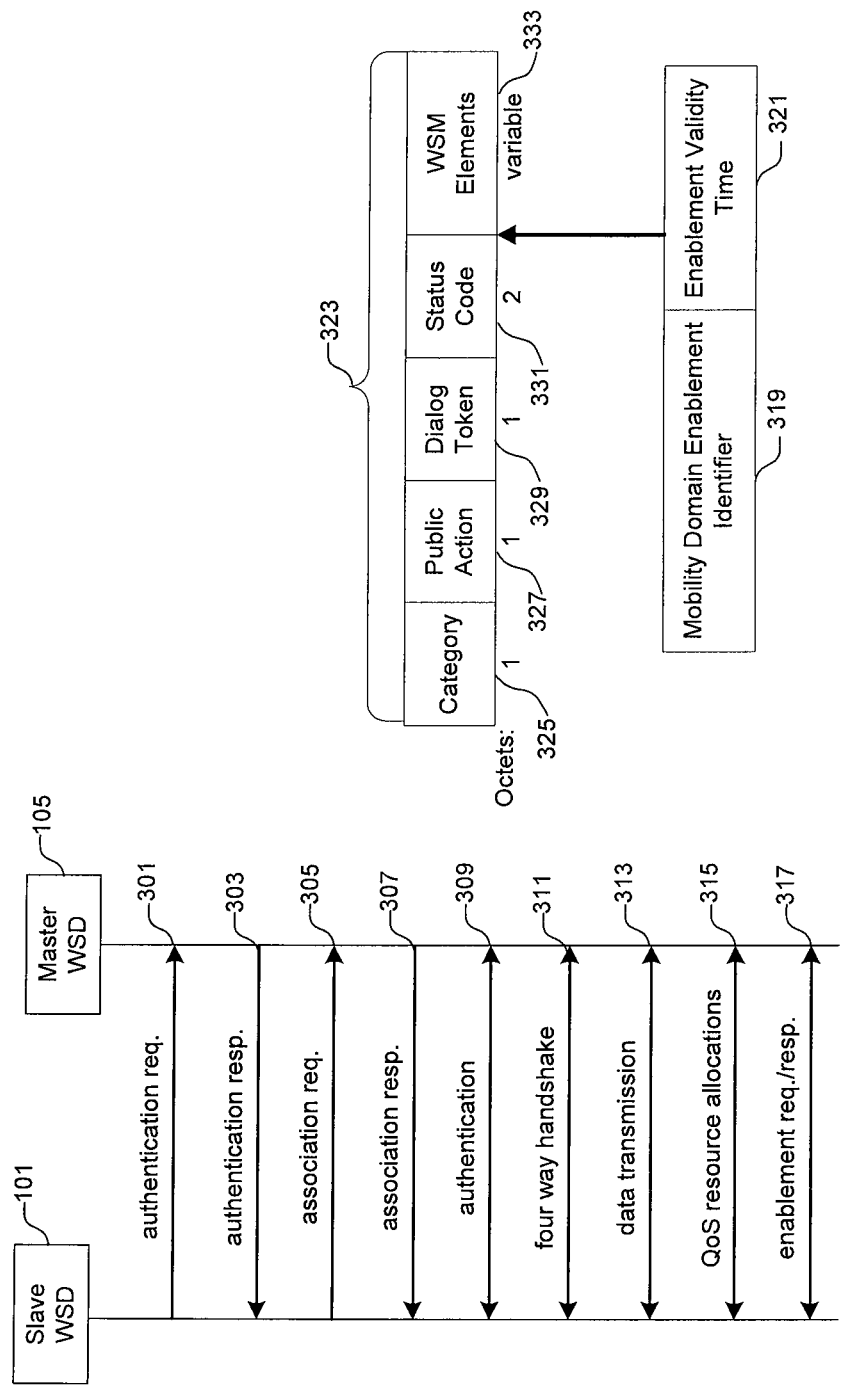
FIG. 3 discloses an exemplary principal enablement implementation in accordance with at least one example embodiment of the present invention.

As an illustrative example of such functionality, with reference to FIG. 3, which shows an exemplary principal enablement implementation employing robust security network (RSN) functionality, FT initial mobility domain association occurs between slave WSD 101 and master WSD 105. Slave WSD 101 and master WSD 105 exchange authentication request frame 301 and authentication response frame 303. Slave WSD 101 and master WSD 105 then exchange association request frame 305 and association response frame 307.

Still further according to the illustrative example, authentication exchange 309, FT four-way handshake 311, and data transmission 313 occur. Optionally quality of service (QoS) resource allocation 315 takes place.

Further according to the illustrative example it is noted that, as such, via FT initial mobility domain association slave WSD 101 obtains the ability to perform FT procedures later on (e.g., via acquisition of parameters such as ESS mobility domain security parameters and/or other security parameters).

Also according to the illustrative example, slave WSD 101 and master WSD 105 partake in enablement request/response exchange 317 (e.g., GDC enablement request/response exchange) whereby slave WSD 101 obtains white space permitted operating parameters. Non-limiting examples of such permitted operating parameters include one or more of available channel list, permitted power levels, and time validities (e.g., parameter time validities).

Further according to the illustrative example, master WSD 105, viewable as a "current" master WSD from the vantage point of potential roam of slave WSD 101 to a different master WSD (e.g., roam to a different master WSD belonging to the same ESS mobility domain as master WSD 105), generates and provides one or more of mobility domain enablement identifier 319 (e.g., a unique mobility domain enablement identifier) and an enablement validity time 321 to slave WSD 101 during enablement request/response exchange 317. As a non-limiting example, enablement validity time 321 is implemented as a time stamp. According to one exemplary implementation, mobility domain enablement identifier 319 and/or enablement validity time 321 are conveyed via one or more of category field 325, public action field 327, dialog token field 329, status code field 331, and white space map (WSM) elements field 333 of enablement response frame 323. According to another exemplary implementation, enablement response frame 323 contains one or more fields in addition to fields 325-333, and mobility domain enablement identifier 319 and/or enablement validity time 321 are conveyed via those one or more additional fields. As a non-limiting example, such provision allows for confirmation (e.g., in accordance with a corresponding validity time) throughout one or more ESS mobility domains (e.g., one or more ESS mobility domains to which master WSD 105 belongs) of the enablement established between slave WSD 101 and master WSD 105. In one possible implementation, master WSD 105 distributes (e.g., via distribution system (DS) messaging) the mobility domain enablement identifier, the enablement validity time, and/or other data to one or more other master WSDs (e.g., other master WSDs belonging to a same ESS mobility domain as master WSD 105).

Still further according to the illustrative example, master WSD 105 optionally uses some or all of a signature of slave WSD 101, some or all of a certificate of slave WSD 101, some or all of a security key of slave WSD 101, and/or some or all of a device identifier of slave WSD 101 in generating the mobility domain enablement identifier. So employing slave WSD 101 signature, slave WSD 101 certificate, slave WSD 101 security key, and/or slave WSD 101 device identifier in mobility domain enablement identifier generation potentially yields benefits including making the mobility domain enablement identifier unique and/or facilitating other master WSDs (e.g., other master WSDs belonging to a same ESS mobility domain as master WSD 105) determining proper correspondence between mobility domain enablement identifier and slave WSD (e.g., in a master WSD determining that a mobility domain enablement identifier properly corresponds to a slave WSD from which it was received).

Also according to the illustrative example, master WSD 105 optionally in enablement confirms a received device identifier of slave WSD 101 (e.g., via one or more of a certificate of slave WSD 101, a signature of slave WSD 101, and a security key of slave WSD 101). Alternately or additionally master WSD 101 optionally in enablement confirms a received device identifier of slave WSD 101 by providing that device identifier to a database (e.g., a WSDB/GDB) and receiving a validation response therefrom (e.g., a unique signature). Confirmation of slave WSD device identifier potentially yields benefits including regulatory compliance. Moreover, optionally information regarding slave WSD device identifier confirmation is stored in a server (e.g., a registered location secure server (RLSS)) and/or distributed (e.g., within a relevant ESS mobility domain).

Further according to the illustrative example, with respect to FIG. 3 it is noted, as non-limiting examples, that authentication request frame 301 and authentication response frame 303 are IEEE 802.11 open system authentication request and authentication response frames, that included in association request frame 305 are a mobility domain information element (MDE) datum and a robust security network element (RSNE) datum, that included in association response frame 307 are a MDE datum and an FTE datum which conveys a pairwise master key R1 key holder identifier (R1KH-ID) datum and a pairwise master key R0 key holder identifier (R0KH-ID) datum, and that these frames provide information employable in subsequent FT operations. As further non limiting examples, authentication exchange 309 involves IEEE 802.1x and/or extensible authentication protocol (EAP) authentication exchange, authentication exchange 309 includes communication between slave WSD 101 and a server (e.g., a remote authentication dial in user service (RADIUS) server), via authentication exchange 309 key seed information employable in FT four-way handshake 311 is set up and/or the master session key (MSK) is established, and authentication exchange 309 is bypassed where a pre-shared key (PSK) is employed. As still further non-limiting examples, FT four-way handshake 311 achieves encryption key creation (e.g., pairwise transient key (PTK) encryption key creation and/or group temporal key (GTK) encryption key creation), and data transmission 313 corresponds to 802.1x controlled port unblocking.

As a non-limiting example, the foregoing is implementable as a modification to IEEE 802.11r FT initial mobility domain association employing RSN functionality wherein, in one aspect, the above-discussed enablement operations are performed subsequent to such FT initial mobility domain association. Moreover, it is noted that although the above-discussed enablement request/response exchange is illustratively explained in conjunction with RSN functionality, such enablement request/response exchange is also applicable where RSN functionality is not implemented.

Over the Air Subordinate Enablement Functionality

Exemplary over the air subordinate enablement functionality will now be discussed.

Figure 4:
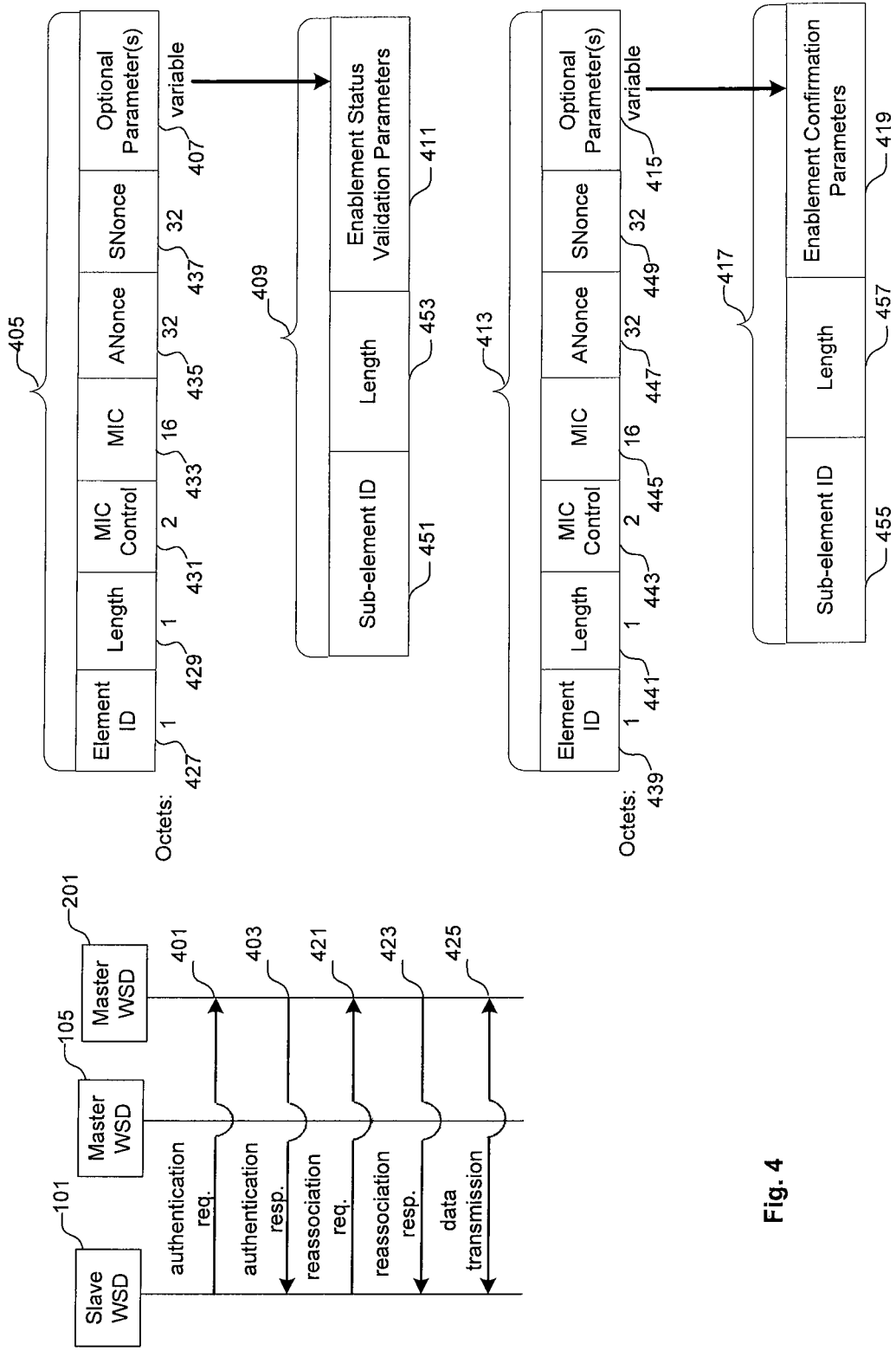
FIG. 4 discloses an exemplary over the air subordinate enablement implementation in accordance with at least one example embodiment of the present invention.

As an illustrative example of such functionality, with reference to FIG. 4, which shows an exemplary over the air subordinate enablement implementation, slave WSD 101 and target master WSD 201 exchange authentication request frame 401 and authentication response frame 403. As a non-limiting example, such exchange is subsequent to slave WSD 101 having made a decision to perform handover (e.g., in connection with slave WSD 101 having reached a trigger point requiring handover) from master WSD 101 (e.g., where slave WSD 101 and master WSD 105 had been involved in data transmission) to another master WSD and master WSD 201 having been determined to be the candidate target master WSD for that handover. Optionally, prior to such exchange of authentication request frame 401 and authentication response frame 403 slave WSD 101 has received one or more of an enabling signal from target master WSD 201, indication that enablement is possible, and parameters employable by slave WSD 101 in initiating FT BSS transition.

Further according to the illustrative example, it is noted that slave WSD 101, in sending authentication request frame 401, sends directly to target master WSD 201, and that slave WSD 101 then anticipates from target master WSD 201 authentication response frame 403 (e.g., including therein FT-related key management parameters, other parameters, and/or other data).

Still further according to the illustrative example, authentication request frame 401 includes FTE 405. Included within optional parameters field 407 of FTE 405 is enablement status validation subelement 409. Enablement status validation subelement 409 provides enablement status validation parameters 411. Included amongst enablement status validation parameters 411 are a mobility domain enablement identifier received by slave WSD 101 from master WSD 105, an enablement validity time received by slave WSD 101 from master WSD 105, a device ID (e.g., an FCC ID), current regulatory parameters (e.g., full or partial white space map containing available channel list, and/or permitted power levels), and/or one or more regulatory parameter validity times. As a non-limiting example, a provided partial white space map is one corresponding to a current operating channel of target master WSD 201. Optionally included amongst enablement status validation parameters 411 are one or more certificates (e.g., one or more unique certificates), one or more keys (e.g., one or more unique keys), and/or one or more digital signatures (e.g., unique digital signatures) employable in confirming the validity of that which is provided via enablement status validation parameters 411 (e.g., to confirm a provided device ID). As a non-limiting example, such a certificate, such a key, and/or such a digital signature is one that slave WSD 101 pre-loads and/or otherwise obtains (e.g., during certification and/or acting in the capacity of an "approved" WSD) from a database (e.g., a WSDB/GDB offering certificate authority functionality). As another non-limiting example, such a certificate, such a key, and/or such a digital signature is providable via one or more device ID validation signature fields.

Additionally according to the illustrative example, the exchange of authentication request frame 401 and authentication response frame 403 between slave WSD 101 and target master WSD 201 corresponds to seeking an authenticated relationship between those WSDs. An authenticated relationship is viewable as a trusted relationship. As such, successful establishment of an authenticated relationship between slave WSD 101 and target master WSD 201 is leveragable to attempt to have target master WSD 201 employ the enablement already granted to slave WSD 101 by master WSD 105 rather than granting a new enablement to slave WSD 101. So employing the already granted enablement potentially yields benefits including eliminating the need for target master WSD 201 to consult a database (e.g., until the expiration of one or more of the enablement validity time and another validity time). As a non-limiting example, such a database for which the need for consultation is eliminated is a WSDB/GDB. The noted data included amongst enablement status validation parameters 411 facilitates so employing the already granted enablement.

Further according to the illustrative example, authentication response frame 403, sent from target master WSD 201 directly to slave WSD 101 in response to authentication request frame 401, includes FTE 413. Included within optional parameters field 415 of FTE 413 is enablement confirmation subelement 417. Enablement confirmation subelement 417 provides enablement confirmation parameters 419. Included amongst enablement confirmation parameters 419 are a directive with respect to employment of the enablement already granted to slave WSD 101 by master WSD 105, a request for additional information, an indication that a database query (e.g., a WSDB/GDB query) is required, a time indication corresponding to a required database query (e.g., an expected maximum time for such database query), an expected periodicity of a CVS frame of the target master WSD 201, and/or a full or partial white space map (e.g., a new full or partial white space map). As a non-limiting example, such directive is one of a directive (e.g., implemented as a status code) that slave WSD 101 employ in connection with target master WSD 201 the enablement already granted by master WSD 105 or a directive (e.g., implemented as a status code) that slave WSD 101 shall not be permitted to employ such already granted enablement in connection with target master WSD 201. Having received authentication response frame 403, slave WSD 101 acts in accordance with it (e.g., employs or abstains from employing the already granted enablement as specified by the directive).

Still further according to the illustrative example, with receipt of authentication request frame 401 target master WSD 201 optionally validates one or more certificates and/or one or more digital signatures received from slave WSD 101 via enablement status validation subelement 409 and, in the case where target master WSD 201 is not able to validate the identity of slave WSD 101, included amongst the enablement confirmation parameters dispatched to slave WSD 101 is the above-discussed directive that slave WSD 101 shall not be permitted to employ the already-granted enablement in connection with target master WSD 201. In the case where target master WSD 201 is able to validate the identity of slave WSD 101, included amongst the enablement confirmation parameters dispatched to slave WSD 101 is the above-discussed directive that slave WSD 101 employ the already-granted enablement.

Additionally according to the illustrative example, with receipt of authentication request frame 401 target master WSD 201 optionally dispatches (e.g., via DS messaging) to master WSD 101 a request to affirm a device ID (e.g., an FCC ID) received from slave WSD 101 via enablement status validation subelement 409. Master WSD 101 subsequently dispatches to target master WSD 201 (e.g., via DS messaging) a corresponding reply. In the case where the reply from master WSD 101 affirms the device ID, included amongst the enablement confirmation parameters dispatched to slave WSD 101 is the above-discussed directive that slave WSD 101 employ the already-granted enablement. In the case where the reply from master WSD 101 does not affirm the device ID, included amongst the enablement confirmation parameters dispatched to slave WSD 101 is the above discussed directive that slave WSD 101 shall not be permitted to employ the already-granted enablement. As a non-limiting example, such affirmation functionality is applicable in connection with FCC-compliant operation.

Also according to the illustrative example, in the case where included amongst the enablement confirmation parameters dispatched to slave WSD 101 is the above discussed directive that slave WSD 101 shall not be permitted to employ the already-granted enablement, master WSD 201 optionally commences a new enablement procedure with respect to slave WSD 101, including optionally querying a database (e.g., a WSDB/GDB).

Additionally according to the illustrative example, with receipt of authentication request frame 401 target master WSD 201 optionally determines whether or not there is call for querying a database (e.g., a WSDB/GDB) with respect to WSD 101. As non-limiting examples, target master WSD 201 determines that there is call for such database query where one or more regulatory parameters (e.g., as set forth by available channel list and/or permitted power levels) received from slave WSD 101 via enablement status validation subelement 409 are invalid and/or inapplicable (e.g., with respect to a BSS of target master WSD 201), where an enablement validity time received from slave WSD 101 via enablement status validation subelement 409 is too short, and/or due to one or more rules and/or restrictions placed by a database (e.g., a WSDB/GDB). In the case where target master WSD 201 determines that there is not call for querying the database, included amongst the enablement confirmation parameters dispatched to slave WSD 101 is the above-discussed directive that slave WSD 101 employ the already-granted enablement. In the case where target master WSD 201 determines that there is call for querying the database, included amongst the enablement confirmation parameters dispatched to slave WSD 101 are one or more of the above-discussed request for additional information, indication that a database query is required, directive that slave WSD 101 shall not be permitted to employ the already-granted enablement in connection with target master WSD 201, and database query time indication.

Further according to the illustrative example, so learning that target master WSD 201 has determined that there is call for querying the database slave WSD 101 subsequently (e.g., after FT authentication) sends a dispatch (e.g., a GDC enablement request frame or other frame) to target master WSD 201 with one or more parameters employable for such database query. Non-limiting examples of such parameters of slave WSD 101 include its technology identifier, device identifier, spectrum mask information, device type, power capabilities, and geo-location information. Receiving such database query parameters from slave WSD 101, master WSD 201 commences a new enablement procedure with respect to slave WSD including querying the database. As a non-limiting example, such functionality involving determination of whether or not there is call for querying a database is applicable in connection with Ofcom-compliant operation.

Also according to the illustrative example, also shown in FIG. 4 are reassociation request frame 421, reassociation response frame 423, and data transmission 425 (e.g., corresponding to 802.1x controlled port unblocking). As non-limiting examples, included in authentication request 401 are a FT authentication algorithm (FTAA) datum, a RSNE datum which conveys a pairwise master key-R0 (PMK-R0) naming identifier datum PMKR0NAME, a MDE datum, and a FTE datum which conveys a nonce datum SNonce and a R0KH-ID datum. As a further non-limiting example, included in authentication response frame 403 are a FTAA datum; a RSNE datum which conveys a PMKR0Name datum, a MDE datum, and a FTE datum which conveys a nonce datum ANonce, a SNonce datum, a R1KH-ID datum, and a R0KH-ID datum. As an additional non-limiting example, included in reassociation request 421 are a RSNE datum which conveys a pairwise master key-R1 (PMK-R1) naming identifier (PMKR1Name) datum, a MDE datum, an FTE datum—which conveys a message integrity check MIC datum, a ANonce datum, a SNonce datum, a R1KH-ID datum, and a R0KH-ID datum—and a resource information container (RIC) request (RIC-Request) datum corresponding to a resource request. As a further non-limiting example, included in reassociation response 423 are a RSNE datum conveying a PMKR1Name datum, a MDE datum, an FTE datum—which conveys a MIC datum, a ANonce datum, a SNonce datum, a R1KH-ID datum, a R0KH-ID datum, and a group temporal key (GTK) indicator (GTK[N]) datum—a GTK indicator (IGTK[M]) datum, and a RIC response (RIC-Response) datum. As a non-limiting example, successful reassociation occurs in connection with the time between authentication request frame 401 and reassociation request frame 421 not exceeding a reassociation deadline time.

Further according to the illustrative example, in FIG. 4 also shown within FTE 405 are element ID field 427, length field 429, MIC control field 431, MIC field 433, ANonce field 435, and SNonce field 437. Also shown within FTE 413 are element ID field 439, length field 441, MIC control field 443, MIC field 445, ANonce field 447, and SNonce field 449. Also shown within enablement status validation subelement 409 are subelement ID datum 451 and length datum 453. Also shown within enablement confirmation subelement 417 are subelement ID datum 455 and length datum 457.

As a non-limiting example, the foregoing is implementable as a modification to IEEE 802.11r over-the-air fast BSS transition wherein, in one aspect, the above-discussed is included in the optional parameters field of the FTE of the authentication request frame and/or the above-discussed is included in the optional parameters field of the FTE of the authentication response frame.

It is noted that, as a non-limiting example, a particular master WSD performs the operations discussed herein in connection with master WSD 105, the operations discussed herein in connection with master WSD 201, and/or both. Accordingly, for instance, a particular master WSD performs the operations discussed herein regarding providing a mobility domain enablement identifier and/or an enablement validity time, the operations discussed herein regarding receiving a mobility domain enablement identifier and/or an enablement validity time, and/or both.

Over the Distribution System (DS) Subordinate Enablement Functionality

Exemplary over the DS subordinate enablement functionality will now be discussed.

Figure 5:
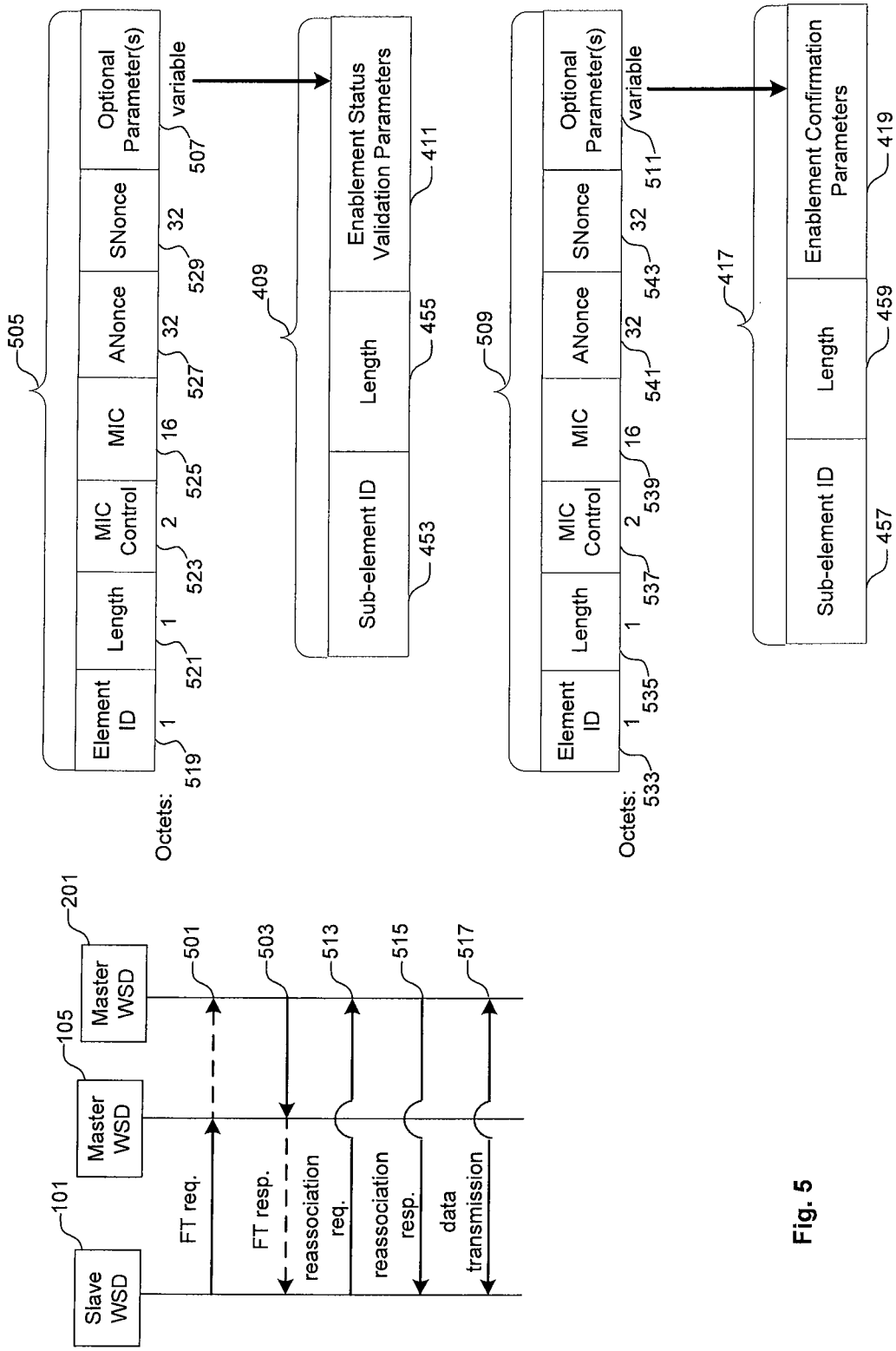
FIG. 5 discloses an exemplary over the distribution system subordinate enablement implementation in accordance with at least one example embodiment of the present invention.

As a first illustrative example of such functionality, with reference to FIG. 5, which shows an exemplary over the DS subordinate enablement implementation employing RSN functionality, slave WSD 101 and target master WSD 201 exchange, via master WSD 105 (e.g., using remote request broker (RRB) functionality), FT action request frame 501 and FT action response frame 503 over a DS by which master WSD 105 and master WSD 201 are connected. As a non-limiting example, such exchange is subsequent to slave WSD 101 having made, in a manner analogous to that discussed above in connection with FIG. 4, a decision to perform handover from master WSD 101 to master WSD 201. Optionally, prior to the exchange of FT action request frame 501 and FT action response frame 503 slave WSD 101 has, in a manner analogous to that discussed above in connection with FIG. 4, received one or more of an enabling signal from target master WSD 201, indication that enablement is possible, and parameters employable by slave WSD 101 in initiating FT BSS transition.

Further according to the first illustrative example, it is noted that slave WSD 101, in sending FT action request frame 501, passes it to master WSD 105, and master WSD 105 then forwards FT action request frame 501 to target master WSD 201 via the DS. Slave WSD 101 anticipates FT action response frame 503 (e.g., including therein FT-related key management parameters, other parameters, and/or other data) from target master WSD 201 over the DS via master WSD 105.

Still further according to the first illustrative example, FT action request frame 501 includes FTE 505. Included within optional parameters field 507 of FTE 505 is the enablement status validation subelement 409 discussed in connection with FIG. 4. As discussed in connection with FIG. 4, enablement status validation subelement 409 provides enablement status validation parameters 411. Included amongst enablement status validation parameters 411 are some or all of the corresponding information discussed in connection with FIG. 4, with corresponding WSD operations being performed in a manner analogous to that discussed in connection with FIG. 4.

Moreover according to the first illustrative example, the exchange of FT action request frame 501 and FT action response frame 503 corresponds to seeking an authenticated relationship between slave WSD 101 and target master WSD 201. As such, successful establishment of an authenticated relationship between these WSDs is leveragable to attempt to have target master WSD 201 employ the enablement already granted to slave WSD 101 by master WSD 105 rather than granting a new enablement to slave WSD 101. As discussed in connection with FIG. 4, so employing an already granted enablement potentially yields benefits including eliminating the need for target master WSD 201 to consult a database (e.g., until the expiration of one or more of the enablement validity time and another validity time).

Additionally according to the first illustrative example, having received FT action request frame 501 from slave WSD 101, master WSD 105 optionally confirms some or all of that which is included amongst enablement status validation parameters 411. As non-limiting examples, master WSD 105 confirms (e.g., by consulting a WSDB/GDB or other database) provided mobility domain enablement identifier, enablement validity time, and/or device ID (e.g., an FCC ID) before forwarding FT action request frame 501 to target master WSD 201. Master WSD 105 optionally adds to FT action request frame 501 before forwarding indication of such confirmation (e.g., an inserted field). As a non-limiting example, master WSD 105 inserts a device ID validation signature field based on the response of its latest device ID validation result for slave WSD 101 from a database (e.g., a WSDB/GDB). The discussed addition before forwarding of indication of enablement status validation parameter confirmation is, as a non-limiting example, applicable in connection with FCC-compliant operation (e.g., where FCC ID is among that which is confirmed).

Further according to the first illustrative example, target master WSD 201 sends FT action response frame 503 to master WSD 105 via the DS, and master WSD 105 forwards FT action response frame 503 to slave WSD 101. FT action response frame 503 includes FTE 509. Included within optional parameters field 511 of FTE 509 is the enablement confirmation subelement 417 discussed in connection with FIG. 4. As discussed in connection with FIG. 4, enablement confirmation subelement 417 provides enablement confirmation parameters 419. Included amongst enablement confirmation parameters 419 are some or all of the corresponding information discussed in connection with FIG. 4, with corresponding WSD operations (e.g., master WSD operations corresponding to the noted directive, request for additional information, indication that a database query is required, and/or time indication) being performed in a manner analogous to that discussed in connection with FIG. 4.

Also according to the first illustrative example, further shown in FIG. 5 are reassociation request frame 513, reassociation response frame 515, and data transmission 517 (e.g., corresponding to 802.1x controlled port unblocking). As non-limiting examples, included in FT action request frame 501 are a FT originator (FTO) datum corresponding to slave WSD 101, a target AP (TargetAP) datum corresponding to target master WSD 201, a RSNE datum which conveys a PMKR0Name datum, a MDE datum, a FTE datum which conveys a SNonce datum and a R0KH-ID datum. As a further non-limiting example, included in FT action response frame 503 are a FTO datum, a TargetAP datum, a RSNE datum which conveys a PMKR0Name datum, a MDE datum, and a FTE datum which conveys a ANonce datum, a SNonce datum, a R1KH-ID datum, and a R0KH-ID datum. As an additional non-limiting example, included in reassociation request frame 513 are a RSNE datum which conveys a PMKR1Name datum, a MDE datum, a FTE datum—which conveys a MIC datum, a ANonce datum, a SNonce datum, a R1KH-ID datum, and a R0KH-ID datum—and a RIC-Request datum. As a further non-limiting example, included in reassociation response frame 515 are a RSNE datum which conveys a PMKR1Name datum, a MDE datum, a FTE datum—which conveys a MIC datum, a ANonce datum, a SNonce datum, a R1KH-ID datum, a R0KH-ID datum, and a GTK[N] datum—a IGTK[M] datum, and a RIC-Response datum. As a non-limiting example, successful reassociation occurs in connection with the time between FT action request frame 501 and reassociation request frame 513 not exceeding a reassociation deadline time.

Further according to the first illustrative example, in FIG. 5 also shown within FTE 505 are element ID field 519, length field 521, MIC control field 523, MIC field 525, ANonce field 527, and SNonce field 529. Also shown within FTE 509 are element ID field 533, length field 535, MIC control field 537, MIC field 539, ANonce field 541, and SNonce field 453.

As a non-limiting example, the foregoing discussed in connection with FIG. 5 is implementable as a modification to IEEE 802.11r over-the-DS fast BSS transition employing RSN functionality wherein, in one aspect, the above-discussed is included in the optional parameters field of the FTE of the FT action request frame and/or the above-discussed is included in the optional parameters field of the FTE of the FT action response frame.

Figure 6:
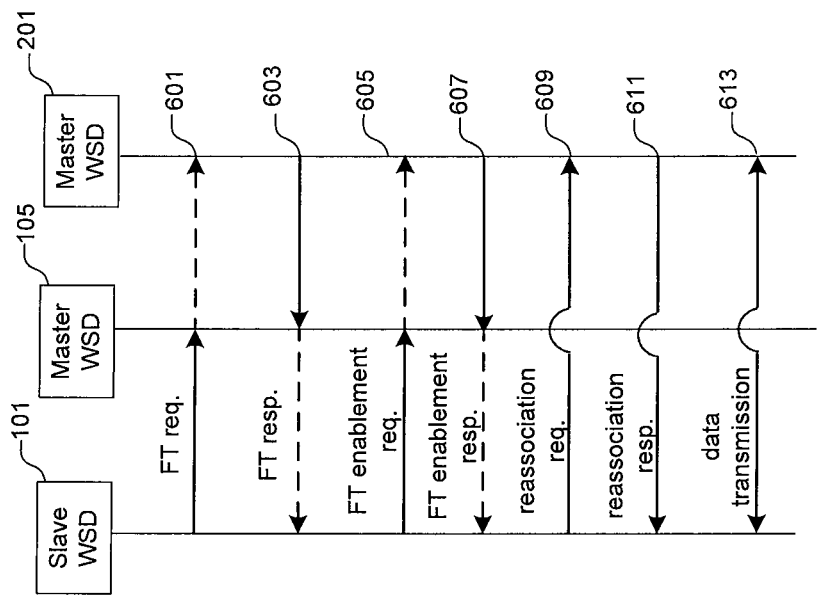
FIG. 6 discloses a further exemplary over the distribution system subordinate enablement implementation in accordance with at least one example embodiment of the present invention.

As a second illustrative example of over the DS subordinate enablement functionality, with reference to FIG. 6, which shows a further exemplary over the DS subordinate enablement implementation, slave WSD 101 and target master WSD 201 exchange via master WSD 105 (e.g., using RRB functionality) FT action request frame 601 and FT action response frame 603 over a DS by which master WSD 105 and master WSD 201 are connected. As a non-limiting example, such exchange is subsequent to slave WSD 101 having made, in a manner analogous to that discussed above in connection with FIG. 4, a decision to perform handover from master WSD 101 to master WSD 201. Optionally, prior to the exchange of FT action request frame 601 and FT action response frame 603 slave WSD 101 has, in a manner analogous to that discussed above in connection with FIG. 4, received one or more of an enabling signal from target master WSD 201, indication that enablement is possible, and parameters employable by slave WSD 101 in initiating FT BSS transition.

Further according to the second illustrative example, slave WSD 101 and target master WSD 201 exchange via master WSD 105 (e.g., using RRB functionality) reassociation request frame 609 and reassociation response frame 611 over the DS by which master WSD 105 and master WSD 201 are connected. Subsequent to the exchange of FT action frames 601 and 603, and prior to the exchange of reassociation frames 609 and 611, slave WSD 101 and target master WSD 201 exchange via master WSD 105 (e.g., using RRB functionality) FT enablement request action frame 605 and FT enablement response action frame 607 over the DS by which master WSD 105 and master WSD 201 are connected.

Figure 7:
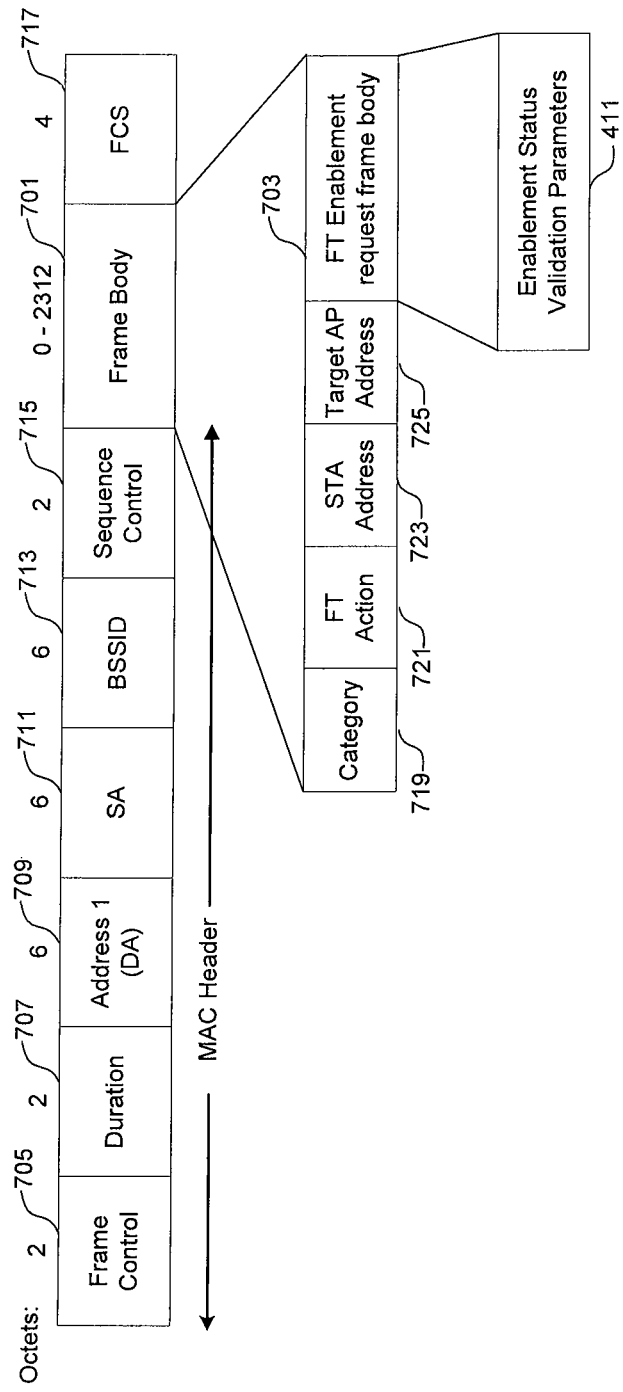
FIG. 7 discloses an exemplary structure for a fast basic service set transition enablement request action frame in accordance with at least one example embodiment of the present invention.

Still further according to the second illustrative example, FIG. 7 shows an exemplary structure for FT enablement request action frame 605 including frame body element 701. Included in frame body element 701 is FT enablement request frame body subelement 703. Provided by FT enablement request frame body subelement 703 are enablement status validation parameters 411, and, as such, some or all of the corresponding information discussed in connection with FIG. 4, with corresponding WSD operations being performed in a manner analogous to that discussed in connection with FIG. 4. Also included in FT enablement request action frame 605 are frame control element 705, duration element 707, address 1 destination address (DA) element 709, source address (SA) element 711, basic service set identification (BSSID) element 713, sequence control element 715, and frame check sequence (FCS) element 717. Also included in frame body element 701 are category subelement 719, FT action subelement 721, STA address subelement 723, and target AP address subelement 725.

Additionally according to the second illustrative example, the exchange of FT action request frame 601 and FT action response frame 603 corresponds to seeking an authenticated relationship between slave WSD 101 and target master WSD 201. As such, successful establishment of an authenticated relationship between these WSDs is leveragable to attempt to have target master WSD 201 employ the enablement already granted to slave WSD 101 by master WSD 105 rather than granting a new enablement to slave WSD 101. As discussed in connection with FIG. 4, so employing an already granted enablement potentially yields benefits including eliminating the need for target master WSD 201 to consult a database (e.g., until the expiration of one or more of the enablement validity time and another validity time). In a fashion analogous to that which is discussed above in connection with FIG. 5, master WSD 105 optionally confirms some or all of that which is included amongst enablement status validation parameters 411 which are provided via FT enablement request frame body subelement 703. As discussed above in connection with FIG. 4, such addition before forwarding of indication of enablement status validation parameter confirmation is, as a non-limiting example, applicable in connection with FCC-compliant operation (e.g., where FCC ID is among that which is confirmed).

Figure 8:
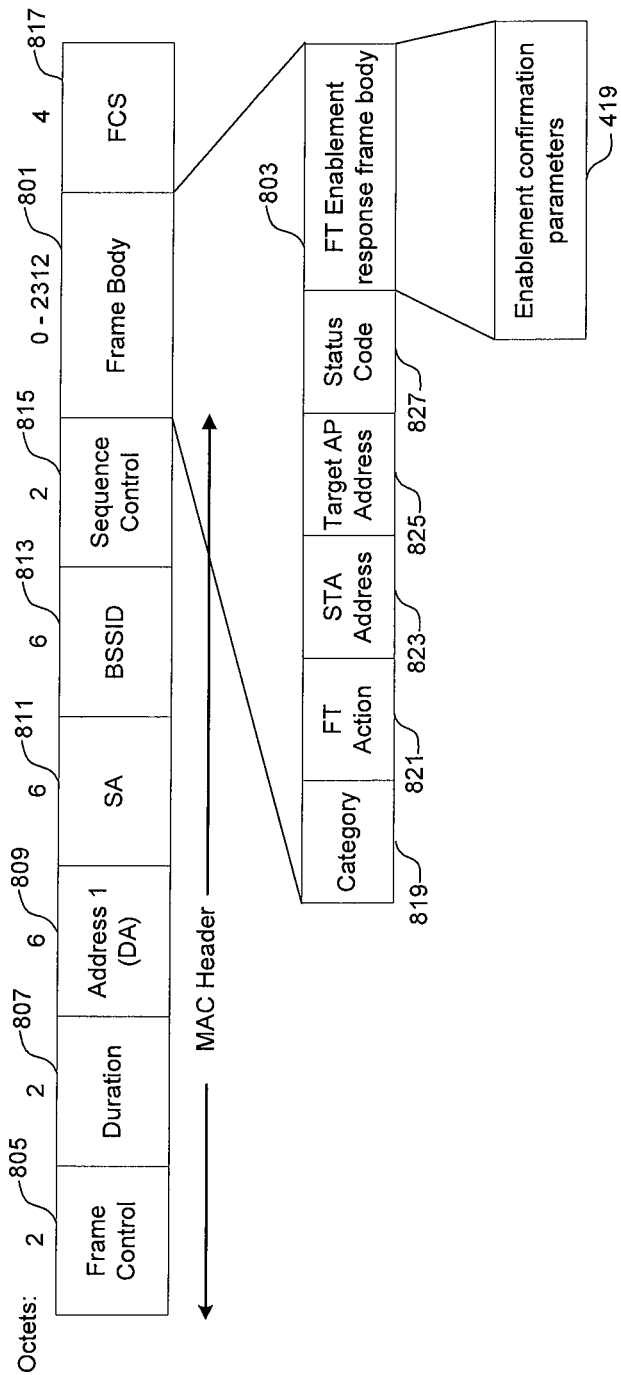
FIG. 8 discloses an exemplary structure for a fast basic service set transition enablement response action frame in accordance with at least one example embodiment of the present invention.

Further according to the second illustrative example, FIG. 8 shows an exemplary structure for FT enablement response action frame 607 including frame body element 801. Included in frame body element 801 is FT enablement response frame body subelement 803. Provided by FT enablement response frame body subelement 803 are enablement confirmation parameters 419, and, as such, some or all of the corresponding information discussed in connection with FIG. 4, with corresponding WSD operations (e.g., master WSD operations corresponding to the noted directive, request for additional information, indication that a database query is required, and/or time indication) being performed in a manner analogous to that discussed in connection with FIG. 4. Also included in FT enablement response action frame 607 are frame control element 805, duration element 807, address 1 DA element 809, SA element 811, BSSID element 813, sequence control element 815, and FCS element 817. Also included in frame body element 801 are category subelement 819, FT action subelement 821, STA address subelement 823, target AP address subelement 825, and status code 827.

Still further according to the second illustrative example, it is noted that functionality discussed in connection with FT enablement request action frame 605 provides enablement status validation parameters 411 to target WSD 201 without employment of an FTE. Likewise, the functionality discussed in connection with FT enablement response action frame 607 provides enablement confirmation parameters 419 to slave WSD 101 without employment of an FTE. As such, these functionalities are employable in connection with both non-robust security network (non-RSN) BSSs, where neither the FT action request frame nor the FT action response frame contains a FTE, and robust security network (RSN) BSSs where the FT action request frame and the FT action response frame each contains a FTE.

Additionally according to the second illustrative example, also shown in FIG. 6 is data transmission 613 (e.g., corresponding to 802.1x controlled port unblocking). With respect to FIG. 6 it is noted that, as a non-limiting example, where RSN functionality is employed, conveyed via FT action request frame 601, FT action response frame 603, reassociation request frame 609, and reassociation response frame 611 are the data items discussed in connection with FT action request frame 501, FT action response frame 503, reassociation request frame 513, and reassociation response frame 515 without FTE field inclusion of enablement status validation subelement 409 and without FTE field inclusion of enablement confirmation subelement 417. Where RSN functionality is not employed, as non-limiting examples included in each of FT action request frame 601 and FT action response frame 603 are a FTO datum, a TargetAP datum, and a MDE datum. As a further non-limiting example, included in reassociation request frame 609 are a MDE datum and a RIC-Request datum, and included in reassociation response frame 611 are a MDE datum and a RIC-Response datum. With further respect to FIG. 6 it is noted that, as a non-limiting example, successful reassociation occurs in connection with the time between FT action request frame 601 and reassociation request frame 609 not exceeding a reassociation deadline time.

As a non-limiting example, the foregoing discussed in connection with FIGS. 6-8 is implementable as a modification to IEEE 802.11r over-the-DS fast BSS transition, both where RSN functionality is employed and where RSN functionality is not employed, wherein, in one aspect, the above-discussed is provided by FT enablement request frame body subelement 703 and/or the above-discussed is provided by FT enablement response frame body subelement 803.

It is noted that, as a non-limiting example, a particular master WSD performs the operations discussed herein in connection with master WSD 105, the operations discussed herein in connection with master WSD 201, and/or both. Accordingly, for instance, a particular master WSD performs the operations discussed herein regarding providing a mobility domain enablement identifier and/or an enablement validity time, the operations discussed herein regarding receiving a mobility domain enablement identifier and/or an enablement validity time, and/or both.

Example embodiments of the invention include an apparatus, comprising:

means for receiving, at a master white space device, slave white space device enablement information, wherein said slave white space enablement information corresponds to a further master white space device enablement grant;

means for performing decision, at the master white space device, with respect to one or more of:

employment, in connection with the master white space device, of the further master white space device enablement grant;

need for additional information; and need for database query; and means for determining to dispatch, from the master white space device, an indication regarding the decision.

Example embodiments of the invention further include an apparatus, comprising:

means for receiving, at a slave white space device, enablement information, wherein said enablement information corresponds to a first master white space device enablement grant;

means for receiving, at the slave white space device, a second master white space device indication of one or more of:

a directive regarding a second master white space device applicability of the first master white space device enablement grant;

a need for additional information; and a database query requirement; and means for performing, at the slave white space device, decision regarding a second master white space device application of the first master white space device enablement grant.

Hardware and Software

The foregoing discusses computers, such as the discussed WSDs, performing a number of operations. Exemplary computers include smart cards, media devices, personal computers, engineering workstations, PCs, Macintoshes, PDAs, portable computers, computerized watches, wired and wireless terminals, telephones, communication devices, nodes servers, network access points, network multicast points, network devices, set-top boxes, personal video recorders (PVRs), game consoles, portable game devices, portable audio devices, portable media devices, portable video devices, televisions, digital cameras, digital camcorders, Global Positioning System (GPS) receivers, wireless personal servers.

Running on such computers are often one or more operating systems. Exemplary operating systems include Windows Phone (e.g., Windows Phone 7), Windows (e.g., Windows 8, Windows 7, or Windows Vista), Windows Server (e.g., Windows Server 8, Windows server 2008, or Windows Server 2003), Maemo, Symbian OS, WebOS, Linux, OS X, and iOS. Supported by optionally such computers are one or more of the S60 Platform, the .NET Framework, Java, and Cocoa.

Exemplary computers also include one or more processors operatively connected to one or more memory or storage units, wherein the memory or storage optionally contains data, algorithms, and/or program code, and the processor or processors execute the program code and/or manipulate the program code, data, and/or algorithms.

Figure 9:
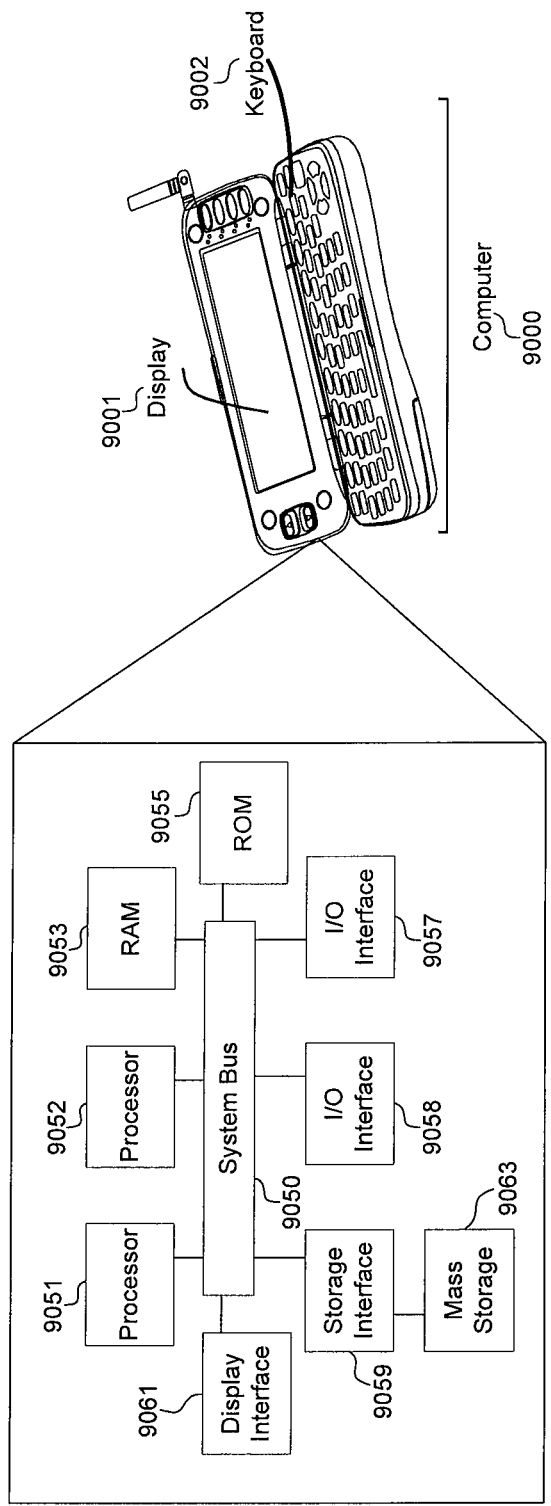
FIG. 9 discloses an exemplary computer in accordance with at least one example embodiment of the present invention.

FIG. 9 shows exemplary computer 9000 including system bus 9050 which operatively connects two processors 9051 and 9052, random access memory 9053, read-only memory 9055, input output (I/O) interfaces 9057 and 9058, storage interface 9059, and display interface 9061. Storage interface 9059 in turn connects to mass storage 9063. Each of I/O interfaces 9057 and 9058 is an Ethernet, IEEE 1394, IEEE 1394b, IEEE 802.11a, 802.11af, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16m, IEEE 802.16x, IEEE 802.20, IEEE 802.22, IEEE 802.15.3, ZigBee (e.g., IEEE 802.15.4), Bluetooth (e.g., IEEE 802.15.1), Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Multimedia Broadcast-Terrestrial (DMB-T), MediaFLO (Forward Link Only), Terrestrial Digital Multimedia Broadcasting (T-DMB), Digital Audio Broadcast (DAB), Digital Radio Mondiale (DRM), General Packet Radio Service (GPRS), Universal Mobile Telecommunications Service (UMTS), Long Term Evolution (LTE), Global System for Mobile Communications (GSM), Code Division Multiple Access 2000 (CDMA2000), DVB-H (Digital Video Broadcasting: Handhelds), HDMI (High-Definition Multimedia Interface), Thunderbolt, or IrDA (Infrared Data Association) interface.

Further according to FIG. 9 mass storage 9063 is a hard drive or flash memory. Each of processors 9051 and 9052 is an ARM-based processor such as a Qualcomm Snapdragon or an x86-based processor such as an Intel Atom or Intel Core. Computer 9000 as shown in this example also includes a touch screen 9001 and physical keyboard 9002. Optionally a mouse or keypad is alternately or additionally employed. Moreover, physical keyboard 9002 is optionally eliminated.

Additionally according to FIG. 9 computer 9000 optionally includes or is attached to one or more image capture devices. Exemplary image capture devices include ones employing Complementary Metal Oxide Semiconductor (CMOS) hardware and ones employing Charge Coupled Device (CCD) hardware. One or more of the image capture devices are according to one exemplary implementation aimed towards the user. Alternately or additionally, one or more of the image capture devices are aimed away from the user. The one or more image capture devices are optionally employed by computer 9000 for video conferencing, still image capture, and/or video capture. Moreover, computer 9000 optionally includes or is attached to one or more card readers, DVD drives, floppy disk drives, hard drives, memory cards, or ROM devices whereby media containing program code—such as program code for performing the discussed operations—is optionally inserted for the purpose of loading the code onto the computer. Further, program code—such as program code for performing the discussed operations—is optionally loaded the code onto the computer via one or more of I/O interfaces 9057 and 9058, perhaps using one or more networks.

According to an exemplary implementation, executed by computers discussed herein are one or more software modules designed to perform one or more of the discussed operations. Such modules are programmed using one or more languages. Exemplary languages include C#, C, C++, Objective C, Java, Perl, and Python. Corresponding program code is optionally placed on media. Exemplary media include DVD, CD-ROM, memory card, and floppy disk.

Any indicated division of operations among particular software modules is for purposes of illustration, and alternate divisions of operation are possible. Accordingly, any operations indicated to be performed by one software module are according to an alternative implementation instead performed by a plurality of software modules. Similarly, any operations indicated to be performed by a plurality of modules are according to an alternative implementation instead be performed by a single module.

Further, any operations indicated to be performed by a particular computer such as a particular WSD are according to an alternative implementation instead performed by a plurality of computers such as by a plurality of WSDs. Moreover, peer-to-peer, cloud, and/or grid computing techniques are optionally employed. Additionally, implementations include remote communication among software modules. Exemplary remote communication techniques include Simple Object Access Protocol (SOAP), Java Messaging Service (JMS), Remote Method Invocation (RMI), Remote Procedure Call (RPC), sockets, and pipes.

Optionally, operations discussed herein are implemented via hardware. Examples of such implementation via hardware include the use of one or more of integrated circuits, specialized hardware, chips, chipsets, Application-Specific Integrated Circuits (ASICs), and Field-Programmable Gate Arrays (FPGAs). As a non-limiting example such hardware is programmed to perform operations discussed herein using one or more languages such as one or more Hardware Description Languages (HDLs). Exemplary HDLs include very-high-speed integrated circuit hardware description language (VDHL) and Verilog.

Figure 10:
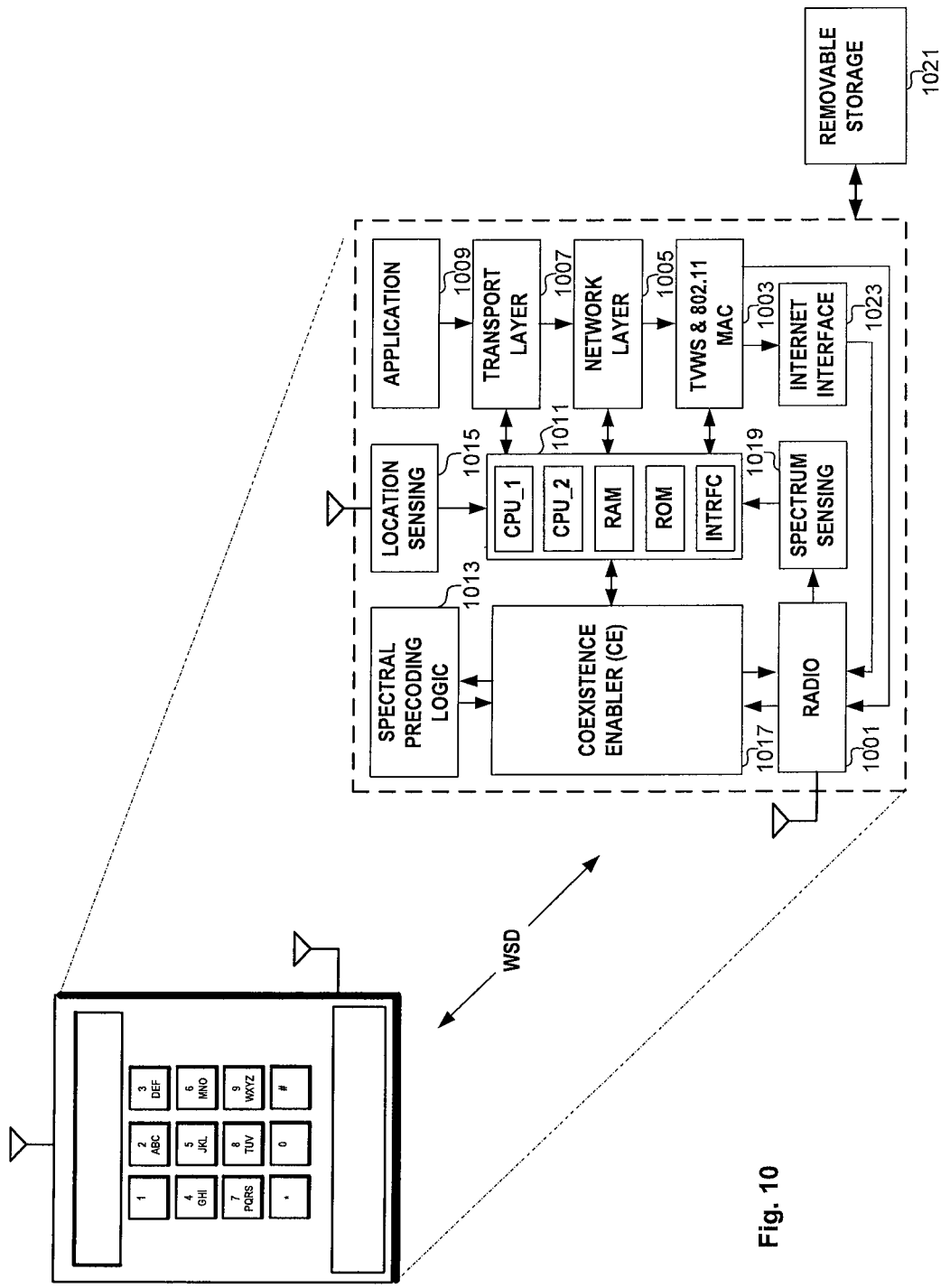
FIG. 10 discloses an exemplary functional block diagram in accordance with at least one example embodiment of the present invention.

FIG. 10 is a functional block diagram according to at least one example embodiment of the invention, illustrating an example master or slave WSD. The device is configured to operate in the TVWS coexistence bands and/or additional RF spectrum bands where there are no primary user radios operating in the neighboring wireless networks, in an example embodiment of the invention.

In an example embodiment of the invention, the WSD includes a protocol stack, including the radio 1001 and the IEEE 802.11 MAC 1003, which is based, for example, on the IEEE 802.11 WLAN standard. The MAC 1003 includes integrated TV white space features. The protocol stack includes a network layer 1005, a transport layer 1007, and an application program 1009. The example WSD includes a processor 1011 that includes a dual or multi core central processing unit CPU_1 and CPU_2, a RAM memory, a ROM memory, and an interface for a keypad, display, and other input/output devices. Spectral precoding logic 1013 is included to suppress side lobe powers arising in a signal due to improperly correlated input data. A location sensor 1015, such as a GPS is included to establish the geographic location of the WSD, and the location of the WSD is reported to the network controller or coexistence manager. The coexistence enabler 1017 optionally sends resource requests to the coexistence manager. The MAC 1003 includes integrated TV white space features to communicate using the radio 1001 in channels in the TV white spaces band reallocated by the coexistence manager, without mutual interference. The spectrum sensor 1019 senses the electromagnetic environment of the WSD and reports it to the coexistence manager.

In an example embodiment of the invention, a WSDB/GDB communicates the allowed emission levels via the Internet to a coexistence manager, which forwards the allowed emission levels via the Internet to coexistence enabler 1017 in the WSD. An Internet interface 1023 may be included in the WSD to facilitate Internet communications.

In an example embodiment of the invention, the interface circuits in FIG. 10 interface with one or more radio transceivers, battery and other power sources, key pad, touch screen, display, microphone, speakers, ear pieces, camera or other imaging devices, etc. The RAM and ROM are optionally removable memory devices such as smart cards, subscriber identity modules (SIMs), wireless identification modules (WIMs), semiconductor memories such as RAM, ROM, PROMS, flash memory devices, etc. The processor protocol stack layers, and/or application program are according to an exemplary implementation embodied as program logic stored in the RAM and/or ROM in the form of sequences of programmed instructions which, when executed in the CPU, carry out the functions of example embodiments. The program logic are according to an exemplary implementation delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they are embodied as integrated circuit logic in the form of programmed logic arrays or custom designed ASICs. The one or more radios in the device are separate transceiver circuits or alternately, the one or more radios are a single RF module capable of handling one or multiple channels in a high speed, time and frequency multiplexed manner in response to the processor.

The WSD of FIG. 10 includes processor 1011 that optionally accesses random access memory RAM and/or read only memory ROM in order to obtain stored program code and data for use during processing. The RAM or ROM generally include removable or imbedded memories that operate in a static or dynamic mode. Further, the RAM or ROM are as illustrative examples rewritable memories such as Flash, EPROM, EEPROM, etc. Examples of removable storage media based on magnetic, electronic and/or optical technologies such as magnetic disks, optical disks, semiconductor memory circuit devices and micro-SD memory cards (SD refers to the Secure Digital standard) are shown at 1021, and optionally serve as a data input/output means. Examples of code include any interpreted or compiled computer language including computer-executable instructions. The code and/or data is optionally used to create software modules such as operating systems, communication utilities, user interfaces, more specialized program modules, etc.

Figure 11:
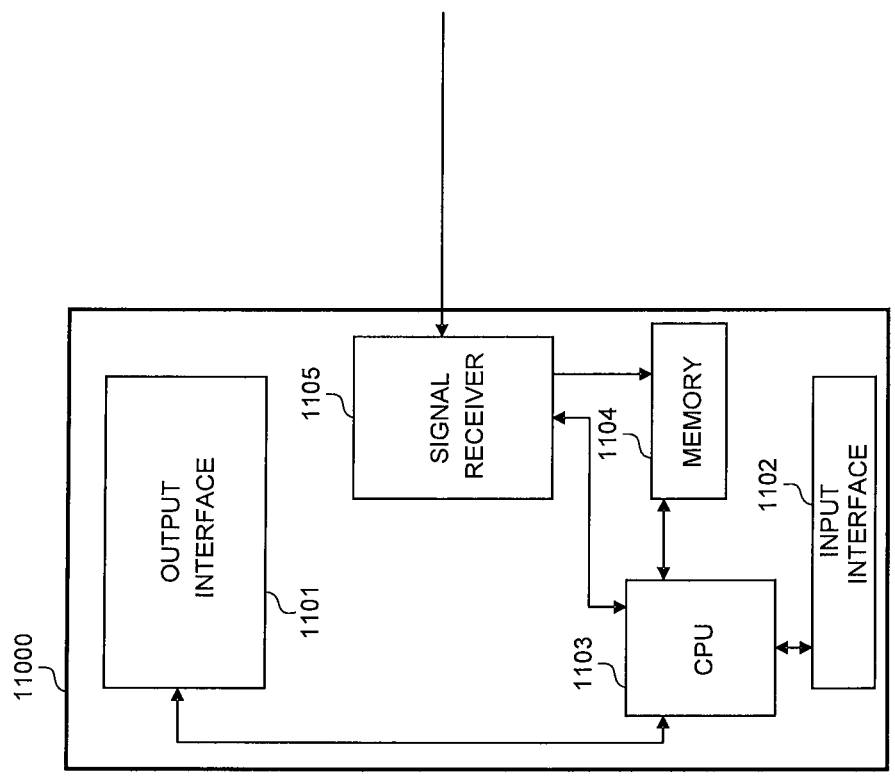
FIG. 11 discloses a further exemplary computer in accordance with at least one example embodiment of the present invention.

As noted, the foregoing discusses computers such as the discussed WSDs. Shown in FIG. 11 is a block diagram of a further exemplary computer, terminal 11000. Exemplary terminal 11000 of FIG. 11 includes a processing unit CPU 1103, a signal receiver 1105, and a user interface (1101, 1102). Examples of signal receiver 1105 include single-carrier and multi-carrier receivers. Signal receiver 1105 and the user interface (1101, 1102) are coupled with the processing unit CPU 1103. One or more direct memory access (DMA) channels exist between multi-carrier signal terminal part 1105 and memory 1104. The user interface (1101, 1102) includes a display and a keyboard that enable a user to use the terminal 11000. In addition, the user interface (1101, 1102) includes a microphone and a speaker for receiving and producing audio signals. The user interface (1101, 1102) optionally employs voice recognition.

The processing unit CPU 1103 a microprocessor (not shown), memory 1104, and optionally software. The software is stored in the memory 1104. The microprocessor controls, on the basis of the software, the operation of the terminal 11000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 11, middleware or software implementation is optionally applied. Examples of terminal 11000 include a hand-held device such as a cellular mobile phone which includes the multi-carrier signal terminal part 1105 for receiving multicast transmission streams. Therefore, the terminal 11000 optionally interacts with service providers.

RAMIFICATIONS AND SCOPE

Although the description above contains many specifics, these are merely provided to illustrate the invention and should not be construed as limitations of the invention's scope. For instance, various examples are articulated herein via the discussion of certain aspects. Such aspects are, themselves, merely exemplary and should not be construed as limitations of the invention's scope. Thus it will be apparent to those skilled in the art that various modifications and variations are applicable to the system and processes of the present invention without departing from the spirit or scope of the invention.

In addition, the embodiments, features, methods, systems, and details of the invention that are described above in the application are combinable separately or in any combination to create or describe new embodiments of the invention.

What is claimed is:

1. A method, comprising:
   receiving, at a master white space device via a direct link from a slave white space device, a request frame comprising slave white space device enablement information, wherein said slave white space enablement information includes further enablement grant information that was previously provided to the slave white space device from a further master white space device, and wherein the further enablement grant information relates to operation of the slave white space device under management of the further master white space, the further enablement grant information providing at least one of channel availability lists, permitted transmit power levels, or one or more permitted operating parameter time validities;
   performing decision, at the master white space device, with respect to one or more of:
      employment, in connection with the master white space device, of the further master white space device enablement grant;
      need for additional information; and
      need for database query; and
   determining to dispatch, from the master white space device, an indication regarding the decision.

2. The method of claim 1, further comprising:
   generating, at the master white space device, further slave white space device enablement information; and
   determining to dispatch, from the master white space device, the generated further white space device enablement information.

3. The method of claim 2, wherein the received white space device enablement information and the further white space device enablement information each comprise an enablement identifier and/or a slave white space device enablement validity time.

4. The method of claim 2, wherein the received white space device enablement information and the further white space device enablement information each further comprise at least one of:
   a slave white space device identifier;
   regulatory operating parameter information; and
   at least one slave white space signature and/or key, wherein said at least one slave white space signature and/or key validates the slave white space identifier.

5. The method of claim 2, further comprising:
   distributing the generated further white space device enablement information to at least one other master white space device via at least one master white space device-to-master white space device link.

6. The method of claim 1, wherein the received white space device enablement information is via an authentication request frame and wherein the dispatch of the indication regarding the decision is via an authentication response frame.

7. A method, comprising:
   receiving, at a slave white space device via an enablement response frame, enablement information from a first master white space device, wherein said enablement information corresponds to a first master white space device enablement grant, and wherein the enablement information relates to operation of the slave white space device under management of the first master white space, the further enablement grant information providing at least one of channel availability lists, permitted transmit power levels, or one or more permitted operating parameter time validities;
   transmitting, by the slave white space device, via a direct link to a second master white space device, a request frame comprising information based on the slave white space device enablement grant that was previously received from the first master white space device;
   transmitting, by the slave white space device, via the direct link to the second master white space device, an authentication request, the authentication request based on the first master white space device enablement grant received from the first white space master device;
   receiving, at the slave white space device via an authentication response frame, from the second master white space device, a second master white space device indication of one or more of:
      a directive regarding the second master white space device applicability of the first master white space device enablement grant;
      a need for additional information; and
      a database query requirement; and
   performing, at the slave white space device, decision regarding the second master white space device application of the first master white space device enablement grant.

8. The method of claim 7, further comprising:
   determining to perform a direct second master white space device provision of said enablement information.

9. The method of claim 7, wherein the enablement information comprises an enablement identifier and/or a slave white space device enablement validity time.

10. The method of claim 7, wherein the enablement information further comprises at least one of:

a slave white space device identifier;
regulatory operating parameter information; and
at least one slave white space signature and/or key, wherein said at least one slave white space signature and/or key validates the slave white space identifier.

11. The method of claim 7, further comprising:
determining to dispatch one or more parameters responsive to said indication of need for additional information.

12. An apparatus, comprising:
at least one processor; and
at least one memory including computer program code, the at least one memory and the computer program code configured to, with the at least one processor, cause the apparatus at least to perform:
receive, at the apparatus via a direct link from a slave white space device, a request frame comprising slave white space device enablement information, wherein said slave white space enablement information includes further enablement grant information that was previously provided to the slave white space device from a further master white space device, and wherein the further enablement grant information relates to operation of the slave white space device under management of the further master white space, the further enablement grant information providing at least one of channel availability lists, permitted transmit power levels, or one or more permitted operating parameter time validities;
perform decision, at the apparatus, with respect to one or more of:
employment, in connection with the apparatus, of the master white space device enablement grant;
need for additional information; and
need for database query; and
determine to dispatch, from the apparatus, an indication regarding the decision.

13. The apparatus of claim 12, wherein the at least one memory and the computer program code are further configured to, with the at least one processor, cause the apparatus to:
generate, at the apparatus, further slave white space device enablement information; and
determine to dispatch, from the apparatus, the generated further white space device enablement information.

14. The apparatus of claim 13, wherein the received white space device enablement information and the further white space device enablement information each comprise an enablement identifier and/or a slave white space device enablement validity time.

15. The apparatus of claim 13, wherein the at least one memory and the computer program code are further configured to, with the at least one processor, cause the apparatus to:
distribute the generated further white space device enablement information to at least one master white space device via at least one master white space device-to-master white space device link.

16. An apparatus, comprising:
at least one processor; and at least one memory including computer program code, the at least one memory and the computer program code configured to, with the at least one processor, cause the apparatus at least to perform:
receive, at the apparatus via an enablement response frame, enablement information from a first master white space device, wherein said enablement information corresponds to a first master white space device enablement grant, and wherein the enablement information relates to operation of the slave white space device under management of the first master white space, the further enablement grant information providing at least one of channel availability lists, permitted transmit power levels, or one or more permitted operating parameter time validities;
transmit, by the apparatus, via a direct link to a second master white space device, a request frame comprising information based on the enablement grant that was previously received from the first master white space device;
transmit, by the apparatus, via the direct link to the second master white space device, an authentication request, the authentication request based on the first master white space device enablement grant received from the first white space master device;
receive, at the apparatus via an authentication response frame, from the second master white space device, a second master white space device indication of one or more of:
a directive regarding the second master white space device applicability of the first master white space device enablement grant;
a need for additional information; and
a database query requirement; and
perform, at the apparatus, decision regarding the second master white space device application of the first master white space device enablement grant.

17. The apparatus of claim 16, wherein the at least one memory and the computer program code are further configured to, with the at least one processor, cause the apparatus to:
determine to perform a direct second master white space device provision of said enablement information.

18. The apparatus of claim 16, wherein the enablement information comprises an enablement identifier and/or a slave white space device enablement validity time.

19. The apparatus of claim 16, wherein the at least one memory and the computer program code are further configured to, with the at least one processor, cause the apparatus to:
determine to dispatch one or more parameters responsive to said indication of need for additional information.

20. A computer program product comprising computer executable program code recorded on a non-transitory computer readable storage medium, the computer executable program code comprising:
code for causing receipt, at a master white space device via a direct link from a slave white space device, a request frame comprising of slave white space device enablement information, wherein said slave white space enablement information includes further enablement grant information that was previously provided to the slave white space device from a further master white space device, and wherein the further enablement grant information relates to operation of the slave white space device under management of the further master white space, the further enablement grant information providing at least one of channel availability lists, permitted transmit power levels, or one or more permitted operating parameter time validities;
code for causing performance of decision, at the master white space device, with respect to one or more of:

employment, in connection with the master white space device, of the further master white space device enablement grant;

need for additional information; and need for database query; and code for causing determination to dispatch, from the master white space device, an indication regarding the decision.

21. A computer program product comprising computer executable program code recorded on a non-transitory computer readable storage medium, the computer executable program code comprising:

code for causing receipt, at a slave white space device via an enablement response frame, of enablement information from a first master white space device, wherein said enablement information corresponds to a first master white space device enablement grant, and wherein the enablement information relates to operation of the slave white space device under management of the first master white space, the further enablement grant information providing at least one of channel availability lists, permitted transmit power levels, or one or more permitted operating parameter time validities;

code for causing transmission, by the slave white space device, via a direct link to a second master white space device, a request frame comprising information based on the slave white space device enablement grant that was previously received from the first master white space device;

code for causing transmission, by the slave white space device, via the direct link to the second master white space device, an authentication request, the authentication request based on the first master white space device enablement grant received from the first white space master device;

code for causing receipt, at the slave white space device via an authentication response frame, from the second master white space device, of a second master white space device indication of one or more of:

a directive regarding the second master white space device applicability of the first master white space device enablement grant;

a need for additional information; and a database query requirement; and code for causing performance, at the slave white space device, of decision regarding the second master white space device application of the first master white space device enablement grant.

* * * * *